(12) United States Patent
Uejima

(10) Patent No.: US 11,374,598 B2
(45) Date of Patent: Jun. 28, 2022

(54) RADIO FREQUENCY MODULE AND COMMUNICATION DEVICE

(71) Applicant: Murata Manufacturing Co., Ltd., Nagaokakyo (JP)

(72) Inventor: Takanori Uejima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/078,101

(22) Filed: Oct. 23, 2020

(65) Prior Publication Data

US 2021/0135695 A1 May 6, 2021

(30) Foreign Application Priority Data

Oct. 31, 2019 (JP) .............................. JP2019-199096

(51) Int. Cl.
*H04B 1/04* (2006.01)
*H04B 1/00* (2006.01)

(52) U.S. Cl.
CPC ......... *H04B 1/0475* (2013.01); *H04B 1/0057* (2013.01); *H04B 1/0458* (2013.01); *H04B 1/0483* (2013.01); *H04B 2001/0408* (2013.01)

(58) Field of Classification Search
CPC .......... H04B 1/0057; H04B 2001/0408; H04B 1/0475; H04B 2001/485; H04B 1/525
USPC .......................... 375/219–220, 262, 295, 297
See application file for complete search history.

(56) References Cited

U.S. PATENT DOCUMENTS

| | | | |
|---|---|---|---|
| 2016/0276097 A1* | 9/2016 | Lewis | H01F 17/0006 |
| 2017/0359097 A1* | 12/2017 | Uchida | H01L 28/10 |
| 2018/0041244 A1* | 2/2018 | Ding | H03F 3/245 |
| 2018/0316319 A1* | 11/2018 | Kim | H01L 23/645 |
| 2021/0067183 A1* | 3/2021 | Abbasi | H03F 1/565 |

FOREIGN PATENT DOCUMENTS

| | | |
|---|---|---|
| CN | 203933639 U | 11/2014 |
| JP | 2000-183488 A | 6/2000 |
| JP | 2014-522216 A | 8/2014 |
| JP | 2015-57802 A | 3/2015 |
| WO | 2017/099145 A1 | 6/2017 |

OTHER PUBLICATIONS

Office Action dated Dec. 2, 2021 in Chinese Patent Application No. 202011172951.9, 15 pages.

* cited by examiner

*Primary Examiner* — Emmanuel Bayard
(74) *Attorney, Agent, or Firm* — Xsensus LLP

(57) ABSTRACT

A radio frequency module includes a module board, a transmission power amplifier, a first inductance element mounted on the module board and connected to an output terminal of the transmission power amplifier, a reception low noise amplifier, a first inductance element mounted on the module board and connected to an input terminal of the reception low noise amplifier, and a wall body made of plated metal and disposed on the module board. The wall body is disposed between the first inductance element and the second inductance element.

20 Claims, 11 Drawing Sheets

(a)

(b)

(a)

(b)

RADIO FREQUENCY MODULE AND COMMUNICATION DEVICE

CROSS REFERENCE TO RELATED APPLICATION

The present application is based on and claims priority to Japanese Patent Application No. 2019-199096 filed on Oct. 31, 2019. The entire disclosure of the above-identified application, including the specification, drawings and claims is incorporated herein by reference in its entirety.

TECHNICAL FIELD

The present disclosure relates to a radio frequency (RF) module and a communication device.

BACKGROUND

In mobile communication devices such as a mobile phone, the arrangement configuration of circuit elements included in radio frequency front-end circuits is becoming complex, particularly with developments in multiband technologies.

Japanese Unexamined Patent Application Publication (Translation of PCT Application) No. 2014-522216 discloses a circuit configuration of a transceiver (transmission and reception circuit) that includes a plurality of transmitters (transmission paths), a plurality of receivers (reception paths), and a switchplexer disposed between an antenna and the plurality of transmitters and the plurality of receivers. The above-described plurality of transmitters each include a transmission circuit, a power amplifier (PA) (transmission PA), and an output circuit. The above-described plurality of receivers each include a reception circuit, a reception low noise amplifier (LNA), and an input circuit. The output circuit includes a transmission filter, an impedance matching circuit, a duplexer, etc. The input circuit includes a reception filter, an impedance matching circuit, a duplexer, etc. According to the above-described configuration, it is possible to perform at least one of simultaneous transmission, simultaneous reception, or simultaneous transmission and reception, by a switching operation performed by the switchplexer.

SUMMARY

Technical Problems

However, as recognized by the present inventor, when the transceiver (transmission and reception circuit) disclosed by Japanese Unexamined Patent Application Publication (Translation of PCT Application) No. 2014-522216 is configured in a single module as a small-sized front-end circuit of a mobile communication device, there are instances where electromagnetic field coupling occurs between an inductance component of the output circuit of one of the above-described transmitters (transmission paths) and an inductance component of the input circuit of one of the above-described receivers (reception paths). In this case, the isolation between the transmission side and the reception side is decreased. In addition, there arises a problem that a harmonic component of a high-power radio frequency transmission signal amplified by the PA (transmission power amplifier) or an intermodulation distortion component between the high-power radio frequency transmission signal and another radio frequency signal flows into the one of the above-described receivers (reception paths) via the above-described electromagnetic field coupling, leading to deterioration in the reception sensitivity of the one of the above-described receivers (reception paths).

In view of the above-described circumstances, the present disclosure is presented to provide a radio frequency module and a communication device that reduce deterioration in the reception sensitivity.

Solutions

In order to provide such a radio frequency module and such a communication device, a radio frequency module according to one aspect of the present disclosure includes: a module board; a transmission power amplifier configured to amplify a radio frequency transmission signal; a first inductance element mounted on the module board and connected to an output terminal of the transmission power amplifier; a reception low noise amplifier configured to amplify a radio frequency reception signal; a second inductance element mounted on the module board and connected to an input terminal of the reception low noise amplifier; and a first wall body disposed on the module board and made of plated metal. In the radio frequency module, the first wall body is disposed between the first inductance element and the second inductance element in a plan view of the module board.

Advantageous Effects

According to the present disclosure, it is possible to provide a radio frequency module and a communication device that reduce deterioration in the reception sensitivity.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
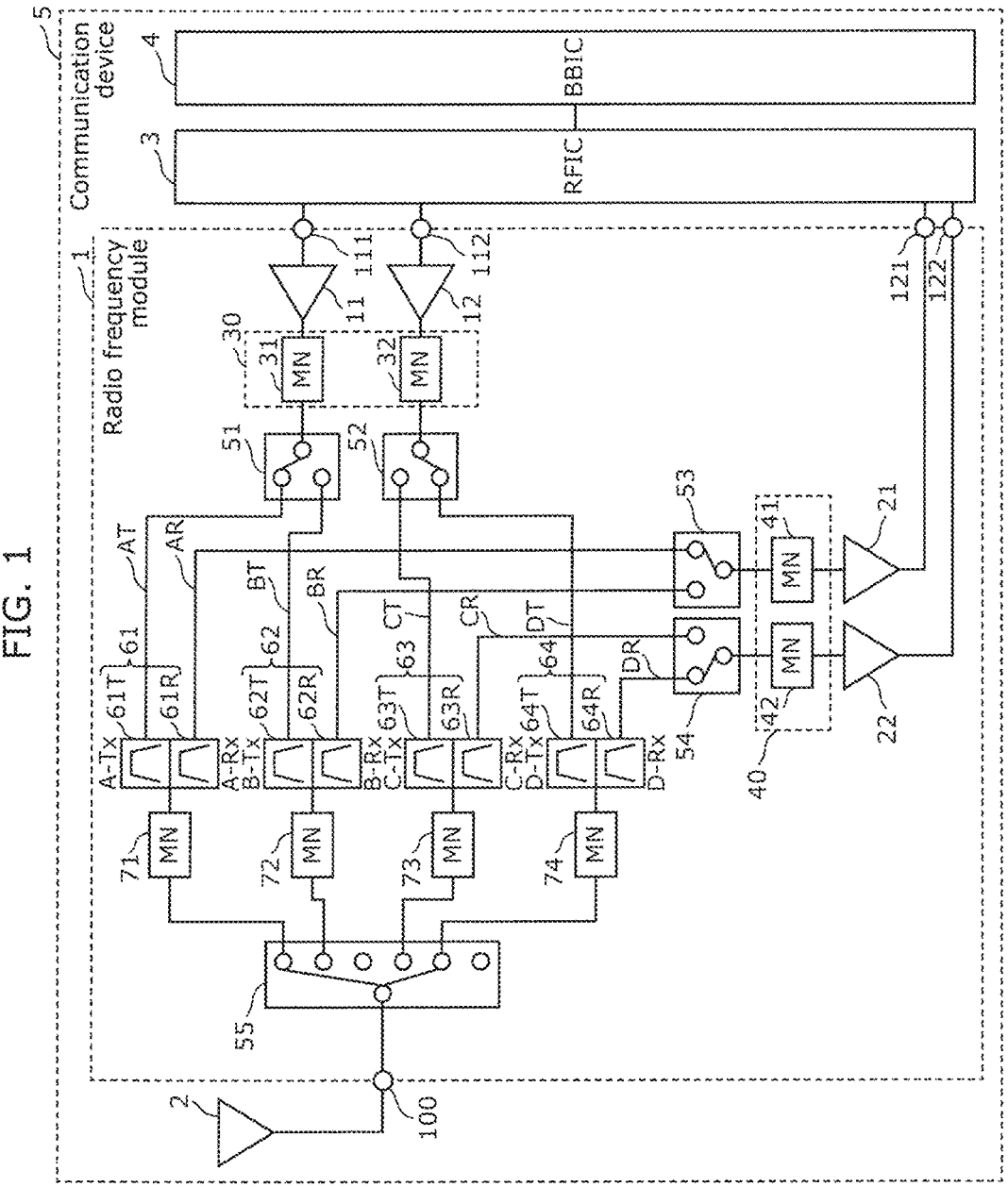
FIG. 1 is a diagram illustrating a circuit configuration of a radio frequency module (or RF front-end circuitry) and a communication device according to an embodiment.

The following describes in detail embodiments of the present disclosure. Each of the embodiments described below illustrates a general or specific example. The numerical values, shapes, materials, structural components, the arrangement and connection of the structural components, and so on, illustrated in the following embodiments, working examples, and variations are mere examples, and therefore do not limit the present disclosure. Among the structural components in the following working examples and variations, structural components not recited in the independent claims are described as arbitrary structural components. In addition, the sizes of structural components and the ratios of the sizes in the drawings are not necessarily strictly illustrated. In each of the diagrams, substantially the same structural components are denoted by the same reference signs, and redundant description may be omitted or simplified.

In addition, in the following description, terms indicating relationships between components such as parallel and vertical and terms indicating the shapes of components such as a quadrilateral shape, and numerical ranges do not represent only the strict meanings but include also a substantially equivalent range, such as a difference of approximately several percent.

In addition, in the following description, in an example of A, B, and C being mounted on a board, "in a plan view of the board (or the principal surface of the board), C is disposed between A and B" means that a straight line connecting an arbitrary point in A and an arbitrary point in B passes through a region in C in a plan view of the board. Furthermore, a plan view of the board means that the board and circuit elements mounted on the board are orthographically projected on a plane parallel to the board.

In addition, in the following description, a "transmission path" refers to a transfer path including a line along which a radio frequency transmission signal propagates, an electrode directly connected to the line, a terminal directly connected to the line or the electrode, etc. Furthermore, a "reception path" refers to a transfer path including a line along which a radio frequency reception signal propagates, an electrode directly connected to the line, a terminal directly connected to the line or the electrode, etc.

In addition, in the following description, "A and B are connected to each other" is applied to not only the case where A and B are physically connected to each other but also the case where A and B are electrically connected to each other. Furthermore, as used herein the terms "circuit" or "circuitry" means one or more circuits, including discrete circuit(s) as well as circuit board(s) and combinations thereof.

Embodiment

1. Circuit Configuration of Radio Frequency Module 1 and Communication Device 5

FIG. 1 is a diagram illustrating a circuit configuration of radio frequency module 1 and communication device 5 according to an embodiment. As illustrated in this diagram, communication device 5 includes radio frequency module 1, antenna 2, RF signal processing circuit (RFIC) 3, and baseband signal processing circuit (BBIC) 4. In this exemplary configuration, the communication device is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes a radio frequency signal to be transmitted by antenna 2 and processes a radio frequency signal received by antenna 2. More specifically, RFIC 3 performs signal processing, by down-conversion or the like, on a radio frequency reception signal input via the reception signal path of radio frequency module 1, and outputs the reception signal generated by the signal processing to BBIC 4. In addition, RFIC 3 performs signal processing, by up-conversion or the like, on a transmission signal input from BBIC 4, and outputs the radio frequency transmission signal generated by the signal processing to the transmission signal path of radio frequency module 1.

BBIC 4 is a circuit that performs signal processing using an intermediate frequency band having a lower frequency than a frequency band of a radio frequency signal that is transferred through radio frequency module 1. The signal processed by BBIC 4 is, for example, used as an image signal for image display or as a sound signal for telephone conversation via a speaker.

RFIC 3 also functions as a controller that controls the connection of switches 51, 52, 53, 54, and 55 included in radio frequency module 1, based on a communication band (frequency band) used. More specifically, RFIC 3 controllably switches connection between switches 51 to 55 included in radio frequency module 1, by a control signal (not illustrated). It should be noted that the controller may be disposed outside RFIC 3, and may be disposed, for example, in radio frequency module 1 or BBIC 4. Moreover, in one example the controller is a remote computer, or a distributed computer system that communicates with radio frequency module 1 via a wireless or wired connection. Likewise, in another example, the controller is a local controller with a user interface that converts input signals into control commands that control communication device 5 as well as subcomponents, such as RF module 1.

Antenna 2 is connected to antenna connection terminal 100 of radio frequency module 1, emits a radio frequency signal that has been output from radio frequency module 1, receives a radio frequency signal from the outside, and outputs the radio frequency signal to radio frequency module 1.

It should be noted that, in communication device 5 according to the present embodiment, antenna 2 and BBIC 4 are not indispensable components, and thus communication device 5 may include interface ports to receive antenna 2 and BBIC 4 as auxiliary components.

Next, a detailed configuration of radio frequency module 1 will be described.

As illustrated in FIG. 1, radio frequency module 1 includes transmission power amplifiers 11 and 12, reception low noise amplifiers 21 and 22, transmission filters 61T, 62T, 63T and 64T, reception filters 61R, 62R, 63R and 64R, transmission output matching circuit 30, reception input matching circuit 40, matching circuits 71, 72, 73 and 74, and switches 51, 52, 53, 54, and 55.

Antenna connection terminal 100 is connected to antenna 2.

Transmission power amplifier 11 is a first transmission power amplifier that amplifies radio frequency signals of communication band A (a first communication band) and communication band B that belong to a first frequency band group. Transmission power amplifier includes an input terminal connected to transmission input terminal 111, and an output terminal connected to matching circuit 31. Transmission power amplifier 12 is a second transmission power amplifier that amplifies radio frequency signals of communication band C (a second communication band) and communication band D that belong to a second frequency band group including frequencies lower than frequencies of the first frequency band group. Transmission power amplifier 12 includes an input terminal connected to transmission input terminal 112, and an output terminal connected to matching circuit 32.

Reception low noise amplifier 21 is a first reception low noise amplifier that amplifies radio frequency signals of communication band A and communication band B with low noise. Reception low noise amplifier 21 includes an input terminal connected to matching circuit 41, and an output terminal connected to reception output terminal 121. Reception low noise amplifier 22 is a second reception low noise amplifier that amplifies radio frequency signals of communication band C and communication band D with low noise. Reception low noise amplifier 22 includes an input terminal connected to matching circuit 42, and an output terminal connected to reception output terminal 122.

Transmission filter 61T is disposed on transmission path AT connecting transmission power amplifier 11 and antenna connection terminal 100, and passes a radio frequency transmission signal in a transmission band of communication band A, among the radio frequency transmission signals that have been amplified by transmission power amplifier 11. Transmission filter 62T is disposed on transmission path BT connecting transmission power amplifier 11 and antenna connection terminal 100, and passes a radio frequency transmission signal in a transmission band of communication band B, among the radio frequency transmission signals that have been amplified by transmission power amplifier 11. Transmission filter 63T is disposed on transmission path CT connecting transmission power amplifier 12 and antenna connection terminal 100, and passes a radio frequency transmission signal in a transmission band of communication band C, among the radio frequency transmission signals that have been amplified by transmission power amplifier 12. Transmission filter 64T is disposed on transmission path DT connecting transmission power amplifier 12 and antenna connection terminal 100, and passes a radio frequency transmission signal in a transmission band of communication band D, among the radio frequency transmission signals that have been amplified by transmission power amplifier 12.

Reception filter 61R is disposed on reception path AR connecting reception low noise amplifier 21 and antenna connection terminal 100, and passes a radio frequency reception signal in a reception band of communication band A, among the radio frequency reception signals that have been input from antenna connection terminal 100. Reception filter 62R is disposed on reception path BR connecting reception low noise amplifier 21 and antenna connection terminal 100, and passes a radio frequency reception signal in a reception band of communication band B, among the radio frequency reception signals that have been input from antenna connection terminal 100. Reception filter 63R is disposed on reception path CR connecting reception low noise amplifier 22 and antenna connection terminal 100, and passes a radio frequency reception signal in a reception band of communication band C, among the radio frequency reception signals that have been input from antenna connection terminal 100. Reception filter 64R is disposed on reception path DR connecting reception low noise amplifier 22 and antenna connection terminal 100, and passes a radio frequency reception signal in a reception band of communication band D, among the radio frequency reception signals that have been input from antenna connection terminal 100.

It should be noted that the above-described transmission filters 61T to 64T, and reception filters 61R to 64R may be, for example, one of a surface acoustic wave filter, an acoustic wave filter using a bulk acoustic wave (BAW), an LC resonant filter, and a dielectric filter, but not limited to these filters.

Transmission filter 61T and reception filter 61R are included in duplexer 61 that has, as a pass band, communication band A. Transmission filter 62T and reception filter 62R are included in duplexer 62 that has, as a pass band, communication band B. Transmission filter 63T and reception filter 63R are included in duplexer 63 that has, as a pass band, communication band C. Transmission filter 64T and reception filter 64R are included in duplexer 64 that has, as a pass band, communication band D.

Transmission output matching circuit 30 includes matching circuits 31 and 32. Matching circuit 31 is disposed on a transmission path connecting transmission power amplifier 11 and transmission filters 61T and 62T, and matches the impedance of transmission power amplifier 11 with the impedance of transmission filters 61T and 62T. Matching circuit 32 is disposed on a transmission path connecting transmission power amplifier 12 and transmission filters 63T and 64T, and matches the impedance of transmission power amplifier 12 with the impedance of transmission filters 63T and 64T.

Reception input matching circuit 40 includes matching circuits 41 and 42. Matching circuit 41 is disposed on a reception path connecting reception low noise amplifier 21 and reception filters 61R and 62R, and matches the impedance of reception low noise amplifier 21 with the impedance of reception filters 61R and 62R. Matching circuit 42 is disposed on a reception path connecting reception low noise amplifier 22 and reception filters 63R and 64R, and matches the impedance of reception low noise amplifier 22 with the impedance of reception filters 63R and 64R.

Switch 51 is one of second switches and disposed on a transmission path connecting matching circuit 31 and transmission filters 61T and 62T. Switch 51 switches between connecting transmission power amplifier 11 to transmission filter 61T and connecting transmission power amplifier 11 to transmission filter 62T. Switch 51 is, for example, a single pole double throw (SPDT) switching circuit which includes a common terminal connected to matching circuit 31, one of selection terminals connected to transmission filter 61T, and the other of the selection terminals connected to transmission filter 62T. Switch 52 is the other of the second switches and disposed on a transmission path connecting matching circuit 32 and transmission filters 63T and 64T. Switch 52 switches between connecting transmission power amplifier 12 to transmission filter 63T and connecting transmission power amplifier 12 to transmission filter 64T. Switch 52 is, for example, an SPDT switching circuit which includes a common terminal connected to matching circuit 32, one of selection terminals connected to transmission filter 63T, and the other of the selection terminals connected to transmission filter 64T. Switch 53 is one of third switches and disposed on a reception path connecting matching circuit 41 and reception filters 61R and 62R. Switch 53 switches between connecting reception low noise amplifier 21 to reception filter 61R and connecting reception low noise amplifier 21 to reception filter 62R. Switch 53 is, for example, an SPDT switching circuit which includes a common terminal connected to matching circuit 41, one of selection terminals connected to reception filter 61R, and the other of the selection terminals connected to reception filter 62R. Switch 54 is the other of the third switches and disposed on a reception path connecting matching circuit 42 and reception filters 63R and 64R. Switch 53 switches between connecting reception low noise amplifier 22 to reception filter 63R and connecting reception low noise amplifier 22 to reception filter 64R. Switch 54 is, for example, an SPDT switching circuit which includes a common terminal connected to matching circuit 42, one of selection terminals connected to reception filter 63R, and the other of the selection terminals connected to reception filter 64R.

Switch 55 is a first switch disposed on a signal path that connects antenna connection terminal 100 to transmission filters 61T to 64T and reception filters 61R to 64R. Switch 55 switches between (1) connecting antenna connection terminal 100 to transmission filter 61T and reception filter 61R, (2) connecting antenna connection terminal 100 to transmission filter 62T and reception filter 62R, (3) connecting antenna connection terminal 100 to transmission filter 63T and reception filter 63R, and (4) connecting antenna connection terminal 100 to transmission filter 64T and reception filter 64R. It should be noted that switch 55 includes a multiple-connection switching circuit capable of simultaneously performing the connecting of two or more of the above-described combinations indicated in (1) to (4).

Matching circuit 71 is disposed on a path connecting switch 55 with transmission filter 61T and reception filter 61R, and matches the impedance of antenna 2 and switch 55 with the impedance of transmission filter 61T and reception filter 61R. Matching circuit 72 is disposed on a path connecting switch 55 with transmission filter 62T and reception filter 62R, and matches the impedance of antenna 2 and switch 55 with the impedance of transmission filter 62T and reception filter 62R. Matching circuit 73 is disposed on a path connecting switch 55 with transmission filter 63T and reception filter 63R, and matches the impedance of antenna 2 and switch 55 with the impedance of transmission filter 63T and reception filter 63R. Matching circuit 74 is disposed on a path connecting switch 55 with transmission filter 64T and reception filter 64R, and matches the impedance of antenna 2 and switch 55 with the impedance of transmission filter 64T and reception filter 64R.

It should be noted that matching circuits 71 to 74 are not indispensable components for the radio frequency module according to the present disclosure.

In the above-described configuration of radio frequency module 1, transmission power amplifier 11, matching circuit 31, switch 51, and transmission filters 61T and 62T are included in a first transmission circuit for outputting a radio frequency transmission signal of communication band A and a radio frequency transmission signal of communication band B toward antenna connection terminal 100. In addition, transmission power amplifier 12, matching circuit 32, switch 52, and transmission filters 63T and 64T are included in a second transmission circuit for outputting a radio frequency transmission signal of communication band C and a radio frequency transmission signal of communication band D toward antenna connection terminal 100. The first transmission circuit and the second transmission circuit are included in transmission circuits for outputting radio frequency transmission signals of communication bands A to D toward antenna connection terminal 100.

Reception low noise amplifier 21, matching circuit 41, switch 53, and reception filters 61R and 62R are included in a first reception circuit for inputting a radio frequency reception signal of communication band A and a radio frequency reception signal of communication band B from antenna 2 via antenna connection terminal 100. In addition, reception low noise amplifier 22, matching circuit 42, switch 54, and reception filters 63R and 64R are included in a second reception circuit for inputting a radio frequency reception signal of communication band C and a radio frequency reception signal of communication band D from antenna 2 via antenna connection terminal 100. The first reception circuit and the second reception circuit are included in reception circuits for inputting radio frequency reception signal of communication bands A to D from antenna connection terminal 100.

It should be noted that the second transmission circuit and the second reception circuit are, for example, circuits for transferring a transmission signal and a reception signal of a communication band that belongs to a low band group. The low band group is a frequency band group including a plurality of communication bands that correspond to 4G and 5G, and has, for example, a frequency range less than or equal to 1 GHz. The low band group includes, for example, long term evolution (LTE) Band 5 (transmission band: 824 MHz to 849 MHz, reception band: 869 MHz to 894 MHz), LTE Band 8 (transmission band: 880 MHz to 915 MHz, reception band: 925 MHz to 960 MHz), LTE Band 28 (transmission band: 703 MHz to 748 MHz, reception band: 753 MHz to 803 MHz), etc.

In addition, the first transmission circuit and the first reception circuit are, for example, circuits for transferring a transmission signal and a reception signal of a communication band that belongs to a middle band group. The middle band group is a frequency band group including a plurality of communication bands that correspond to 4G and 5G, and is lower than the low band group. The middle band group has, for example, a frequency range from 1.5 GHz to 2.2 GHz. The middle band group includes communication bands such as LTE Band 1 (transmission band: 1920 MHz to 1980 MHz, reception band: 2110 MHz to 2170 MHz), Band 39 (transmission/reception band: 1880 MHz to 1920 MHz), and Band 66 (transmission band: 1710 MHz to 1780 MHz, reception band: 2110 MHz to 2200 MHz).

In addition, the first transmission circuit and the first reception circuit may be, for example, circuits for transferring a transmission signal and a reception signal of a communication band that belongs to a high band group. The high band group is a frequency band group including a plurality of communication bands that correspond to 4G and 5G, and is higher than the middle band group. The high band group has, for example, a frequency range from 2.4 GHz to 2.8 GHz. The high band group includes communication bands such as LTE Band 7 (transmission band: 2500 MHz to 2570 MHz, reception band: 2620 MHz to 2690 MHz), Band 41 (transmission/reception band: 2496 MHz to 2690 MHz), etc.

According to the above-described circuit configuration, radio-frequency module 1 according to the present embodiment is capable of performing at least one of simultaneously transmitting, simultaneously receiving, or simultaneously transmitting and receiving a radio-frequency signal of either communication band A or communication band B and a radio frequency signal of either communication band C or communication band D.

It should be noted that, the radio frequency module according to the present disclosure may be implemented without connecting the transmission circuits and the reception circuits to antenna connection terminal 100 via switch 55, and the above-described transmission circuits and the above-described reception circuits may be connected to antenna 2 via different terminals. In addition, it is sufficient if the radio frequency module according to the present disclosure includes, as a circuit configuration, at least transmission power amplifier 11, matching circuit 31, reception low noise amplifier 21, and matching circuit 41. In this case, the radio frequency module need not necessarily include switches 51 to 55, transmission filters 61T to 64T, and reception filters 61R to 64R. Furthermore, in the system of this case, radio frequency signals of two or more communication bands are not simultaneously transmitted, simultaneously received, or simultaneously transmitted and received, and radio frequency signals of a single communication band are transmitted and received.

Here, when the circuit elements included in radio frequency module 1 described above are configured in a single module as a small-sized front-end circuit, for example, it is expected that electromagnetic field coupling occurs between an inductance component of transmission output matching circuit 30 and an inductance component of reception input matching circuit 40. In this case, there are instances where a harmonic component of a high-power radio frequency transmission signal that has been amplified by transmission power amplifier 11 or 12 or an intermodulation distortion component between the radio frequency transmission signal and another radio frequency signal flows into the reception circuits via the above-described electromagnetic field coupling, leading to a problem such as deterioration in the reception sensitivity of the reception circuits. For instance, the case where the frequency of a harmonic of a transmission signal that has been amplified by transmission power amplifier 12 overlaps at least a portion of the reception band of communication band A can be given as one example. In addition, for instance, the case where the frequency of an intermodulation distortion between the radio frequency transmission signal that has been amplified by transmission power amplifier 11 overlaps at least a portion of the reception band of communication bands A to D can be given as one example.

In contrast, radio frequency module 1 according to the present embodiment has a configuration that reduces electromagnetic field coupling between an inductance component of transmission output matching circuit 30 (first inductance element) and an inductance component of reception input matching circuit 40 (second inductance element). The following describes the configuration of radio frequency module 1 according to the present embodiment that reduces the above-described electromagnetic field coupling.

2. Arrangement Configuration of Circuit Elements of Radio Frequency Module 1A According to Working Example 1

Figure 2A:
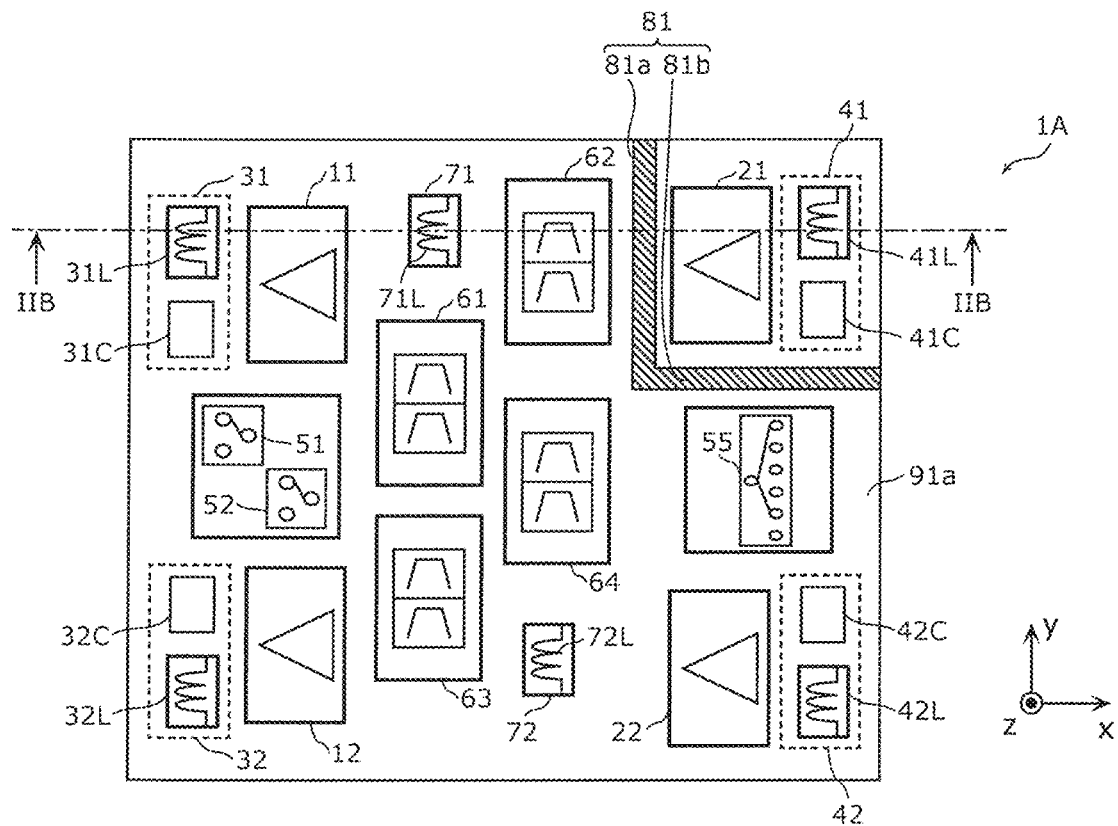
FIG. 2A is a schematic diagram illustrating a plan view configuration of a radio frequency module according to Working Example 1.
Figure 2B:
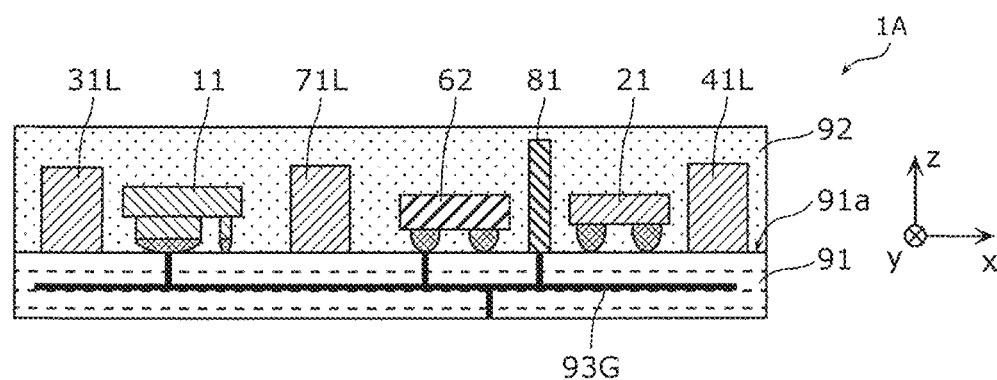
FIG. 2B is a schematic diagram illustrating a cross-sectional configuration of the radio frequency module according to Working Example 1.

FIG. 2A is a schematic diagram illustrating a plan view configuration of radio frequency module 1A according to Working Example 1. FIG. 2B is a schematic diagram illustrating a cross-sectional configuration of radio frequency module 1A according to Working Example 1. More specifically, FIG. 2B is a cross-sectional view taken along line IIB-IIB of FIG. 2A Radio frequency module 1A according to Working Example 1 specifically illustrates the arrangement configuration of the respective circuit elements included in radio frequency module 1 according to the embodiment.

As illustrated in FIG. 2A and FIG. 2B, radio frequency module 1A according to the present working example further includes module board 91, wall body 81, and resin component 92 in addition to the circuit configuration illustrated in FIG. 1.

Module board 91 is a board which includes principal surface 91a on which the above-described transmission circuit and the above-described reception circuit are mounted. As module board 91, for example, a low temperature co-fired ceramic (LTCC) board having a stacked structure including a plurality of dielectric layers, a high temperature co-fired ceramic (HTCC) board, a component built-in board, a board including a redistribution layer (RDL), or a printed board or the like is used. It should be noted that antenna connection terminal 100, transmission input terminals 111 and 112, and reception output terminals 121 and 122 may be disposed on module board 91.

Wall body 81, which is one example of a first wall body, is disposed on module board 91 and made of plated metal. In other words, wall body 81 is a metal body that has been grown by plating. Wall body 81 protrudes in the z-axis positive direction from principal surface 91a of module board 91. Wall body 81 includes flat plate 81a formed along the y-axis direction and the z-axis direction and flat plate 81b formed along the x-axis direction and the z-axis direction. It should be noted that wall body 81 need not necessarily include a plurality of flat plates as in the present working example. Wall body 81 may be a single flat plate. In addition, the flat plate included in wall body 81 may have a curved surface.

Resin component 92 is disposed on principal surface 91a of module board 91 and covers the above-described transmission circuit, the above-described reception circuit, and principal surface 91a of module board 91. Resin component 92 has a function of ensuring reliability such as mechanical strength and moisture resistance of the circuit elements included in the above-described transmission circuit and the above-described reception circuit. It should be noted that resin component 92 is not indispensable component for the radio frequency module according to the present disclosure.

As illustrated in FIGS. 2A and 2B, in radio frequency module 1A according to the present working example, transmission power amplifiers 11 and 12, reception low noise amplifiers 21 and 22, duplexers 61 to 64, matching circuits 31, 32, 41, and 42, and switches 51, 52, and 55 are surface-mounted on principal surface 91a of module board 91. It should be noted that, although switches 53 and 54 and matching circuits 73 and 74 are not illustrated in FIG. 2A and FIG. 2B, switches 53 and 54 and matching circuits 73 and 74 may be surface-mounted on principal surface 91a of module board 91, or may be built-in in module board 91.

Matching circuit 31 includes inductor 31L and capacitor 31C. Matching circuit 32 includes inductor 32L and capacitor 32C. Matching circuit 41 includes inductor 41L and capacitor 41C. Matching circuit 42 includes inductor 42L and capacitor 42C. Inductor 31L is a first inductance element connected to an output terminal of transmission power amplifier 11, and inductor 32L is a first inductance element connected to an output terminal of transmission power amplifier 12. Inductors 31L and 32L each include, for example, a chip inductor or a line pattern disposed on principal surface 91a. Inductor 41L is a second inductance element connected to an input terminal of reception low noise amplifier 21, and inductor 42L is a second inductance element connected to an input terminal of reception low noise amplifier 22. Inductors 41L and 42L each include, for example, a chip inductor or a line pattern disposed on principal surface 91a. It should be noted that matching circuit 31 need not necessarily include capacitor 31C. In addition, matching circuit 32 need not necessarily include capacitor 32C. In addition, matching circuit 41 need not necessarily include capacitor 41C. In addition, matching circuit 42 need not necessarily include capacitor 42C.

Matching circuit 71 includes inductor 71L. Matching circuit 72 includes inductor 72L. Inductor 71L is a third inductance element disposed between (i) antenna connection terminal 100 and (ii) transmission filter 61T and reception filter 61R. Inductor 72L is a third inductance element disposed between (i) antenna connection terminal 100 and (ii) transmission filter 62T and reception filter 62R. Inductors 71L and 72L each include, for example, a chip inductor or a line pattern disposed on principal surface 91a. It should be noted that matching circuit 71 may include a capacitor. In addition, matching circuit 72 may include a capacitor.

Here, in radio frequency module 1A according to the present working example, inductor 41L and inductor 31L are separated by wall body 81. In other words, wall body 81 is disposed between inductor 41L and inductor 31L in a plan view of principal surface 91a. In addition, inductor 41L and inductor 32L are separated by wall body 81. In other words, wall body 81 is disposed between inductor 41L and inductor 32L in a plan view of principal surface 91a.

According to the above-described configuration, wall body 81 made of plated metal is disposed between inductor 41L and inductor 31L which are mounted on module board 91. A plated metal body has a higher density than a metal body formed by metallic paste coating. For that reason, it is possible to shield an electromagnetic field generated from inductors 41L and 31L, by wall body 81 that has high conductivity. As a result, it is possible to significantly reduce electromagnetic field coupling between inductor 41L and inductor 31L. It is thus possible to improve the isolation between the transmission side and the reception side.

In addition, since wall body 81 made of plated metal is disposed between inductor 41L and inductor 32L which are mounted on module board 91, it is possible to inhibit a harmonic component of a high-power radio frequency transmission signal that has been amplified by transmission power amplifier 12 of the second transmission circuit or an intermodulation distortion component between the high-power radio frequency transmission signal and another radio frequency signal from flowing into the first reception circuit via the above-described electromagnetic field coupling. Accordingly, it is possible to reduce deterioration in the reception sensitivity of radio frequency module 1A.

For example, in radio frequency module 1A, transmission power amplifier 12 is applied to an amplifier that amplifies a radio frequency signal of a frequency band included in a low band group (1 GHz or less), and reception low noise amplifier 21 is applied to an amplifier that amplifies a radio frequency signal of a frequency band included in a middle band group (1.5 GHz-2.2 GHz) or a high band group (2.4 GHz to 2.8 GHz).

In this case, a frequency of a second harmonic or a third harmonic of a radio frequency transmission signal that has been amplified by transmission power amplifier 12 corresponding to the low band group is included in the middle band group or the high band group. In this case as well, the electromagnetic field coupling between inductor 41L and inductor 32L can be significantly reduced by wall body 81, and thus it is possible to reduce the amount of the harmonic flowing into the first reception circuit. As a result, it is possible to reduce deterioration in the reception sensitivity of communication band 1A.

It should be noted that it is sufficient if wall body 81 is disposed between either inductor 41L and inductor 32L or inductor 41L and inductor 31L. From this perspective, wall body 81 need not necessarily include both of flat plates 81a and 81b. Wall body 81 may be either flat plate 81a or flat plate 81b as long as wall body has a configuration that separates the first inductance element and the second inductance element. In addition, wall body 81 need not necessarily be a flat plate as in the present working example, and may have a curved surface.

With conventional radio frequency modules, a shielding wall that separates a plurality of circuit components is formed after the plurality of circuit components are mounted on a module board. More specifically, after a module board on which a plurality of circuit components are mounted is molded by a resin component, a groove is provided to the resin component in the region in which a shielding wall is to be formed. Then, the above-described shielding wall is formed by filling the above-described groove with metal by sputtering or the like. In this case, however, in the laser processing process for forming the groove and in the sputtering film deposition process, the plurality of circuit components which are already arranged on the module board will be heated. Among the plurality of circuit components, semiconductor components are particularly prone to property degradation, structural disorder, etc. due to the above-described heating. In addition, the above-described groove is a recess portion having an elongated shape, and thus the sputtering film deposition is required to be performed for a long period of time in order to fill the groove with metal. Accordingly, stress is caused to the module board and the resin component by the heating in the film deposition process, leading to a possible warpage or waviness in the module board.

In contrast, in radio frequency module 1A according to the present working example, wall body 81 as a shielding wall is formed by a plating process. More specifically, first, a seed layer that serves as an underlayer of wall body 81 is formed in a state in which circuit components are not mounted on module board 91. Next, on module board 91 on which the seed layer is formed, a recess portion (a portion to which the seed layer is to be exposed) is formed in a desired position for forming wall body 81 by photo sensitive resist or the like. Next, on the seed layer exposed to the above-described recess portion, metal such as Au or Cu is grown by electroplating to form wall body 81. Next, a photo sensitive resist is removed. Finally, a plurality of circuit components are mounted on module board 91 on which wall body 81 is formed.

With the above-described manufacturing process of radio frequency module 1A according to the present working example, it is possible to mount, after the forming process of wall body 81, transmission power amplifiers 11 and 12, reception low noise amplifiers 21 and 22, switches 51 to 55, duplexers 61 to 64 to be mounted on module board 91. As a result, it is possible to prevent property degradation or structural disorder of these semiconductor components which is caused by the heating in the forming process of wall body 81. In addition, the forming process of wall body 81 does not include heating to be performed for a long period of time, and thus it is possible to reduce warpage or waviness of module board 91.

In addition, use of conductive paste to form a wall body can be given as a process in order to reduce heating during the forming of the wall body. However, a wall body formed using conductive paste has a lower density than a wall body formed through plating, and thus has low conductivity.

It should be noted that, as illustrated in FIG. 2B, it is desirable that wall body 81 be taller than inductors 41L and 31L. According to the above-described configuration, it is possible to more strongly shield the electromagnetic field generated from inductors 41L and 31L. In addition, wall body 81 may be not exposed from resin component 92 as illustrated in FIG. 2B, or may be exposed from resin component 92.

In addition, in radio frequency module 1A according to the present working example, wall body 81 may be connected to ground conductor 93G that module board 91 includes as illustrated in FIG. 2B. According to the above-described configuration, it is possible to strengthen the electromagnetic shielding function of wall body 81.

In addition, in radio frequency module 1A according to the present working example, transmission power amplifier 11 is disposed in, of two regions separated by wall body 81, a region in which inductor 31L is disposed. In addition, transmission power amplifier 12 is disposed in, of the two regions separated by wall body 81, a region in which inductor 32L is disposed. Meanwhile, reception low noise amplifier 21 is disposed in, of the two regions separated by wall body 81, a region in which inductor 41L is disposed. In this arrangement configuration, in a plan view of module board 91, wall body 81 is disposed between reception low noise amplifier 21 and transmission power amplifiers 11 and 12.

According to the above-described configuration, it is possible to shield the electromagnetic field generated from transmission power amplifiers 11 and 12 and reception low noise amplifier 21, by wall body 81 that has high conductivity. As a result, it is possible to significantly reduce electromagnetic field coupling between (i) the transmission circuit including transmission power amplifiers 11 and 12 and inductors 31L and 32L and (ii) the first reception circuit including reception low noise amplifier 21 and inductor 41L. It is thus possible to further improve the isolation between the transmission side and the reception side.

It should be noted that reception low noise amplifier 22 and inductor 42L may be disposed, of the two regions separated by wall body 81, in a region in which inductor 41L is disposed. According to the above-described configuration, it is possible to reduce electromagnetic field coupling between (i) the transmission circuit including transmission power amplifiers 11 and 12 and inductors 31L and 32L and (ii) the second reception circuit including reception low noise amplifier 22 and inductor 42L. It is thus possible to improve the isolation between the transmission side and the reception side.

In addition, in radio frequency module 1A according to the present working example, wall body 81 is disposed between inductor 41L and inductor 71L in a plan view of module board 91. In addition, wall body 81 is disposed between inductor 41L and inductor 72L in a plan view of module board 91.

According to the above-described configuration, it is possible to significantly reduce electromagnetic field coupling between inductor 41L and inductor 71L. In addition, it is possible to significantly reduce electromagnetic field coupling between inductor 41L and inductor 72L. For that reason, it is possible to inhibit (i) a radio frequency signal that has been input from antenna connection terminal 100 and (ii) a high-power radio frequency transmission signal that has been amplified by transmission power amplifier 11 or 12 and a harmonic component thereof from flowing into a reception circuit without passing through reception filter 61R or 62R. As a result, it is possible to reduce deterioration in the reception sensitivity of radio frequency module 1A.

It should be noted that the wall body that separates inductor 41L and inductor 71L may be a second wall body that is different from wall body 81. In addition, the wall body that separates inductor 41L and inductor 72L may be a second wall body that is different from wall body 81.

3. Arrangement Configuration of Circuit Elements of Radio Frequency Module 1B According to Variation 1

Figure 3A:
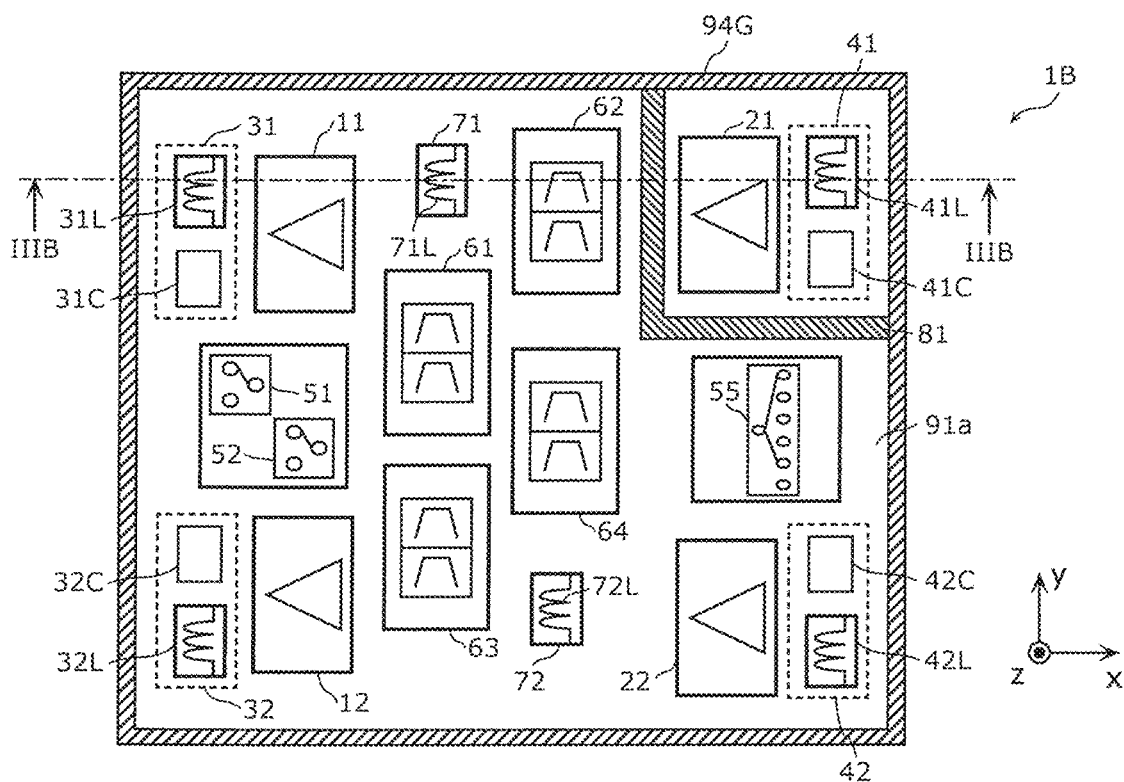
FIG. 3A is a schematic diagram illustrating a plan view configuration of the radio frequency module according to Variation 1.
Figure 3B:
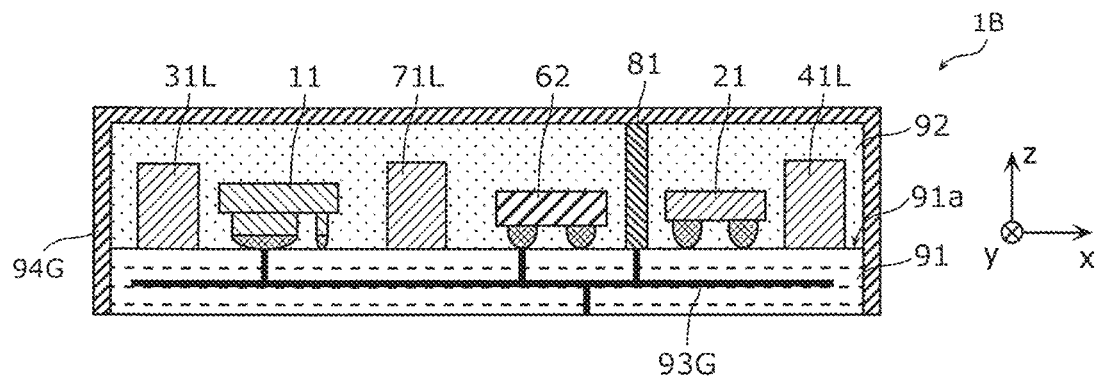
FIG. 3B is a schematic diagram illustrating a cross-sectional configuration of the radio frequency module according to Variation 1.

FIG. 3A is a schematic diagram illustrating a plan view configuration of radio frequency module 1B according to Variation 1. FIG. 3B is a schematic diagram illustrating a cross-sectional configuration of radio frequency module 1B according to Variation 1. More specifically, FIG. 3B is a cross-sectional view taken along line IIIB-IIIB of FIG. 3A. Radio frequency module 1B according to Variation 1 specifically illustrates the arrangement configuration of the respective circuit elements included in radio frequency module 1 according to the embodiment.

Radio frequency module 1B according to the present variation is different from radio frequency module 1A according to Working Example 1 in that shielding film 94G is additionally included. Hereinafter, radio frequency module 1B according to the present variation will be described. In the description, the same points as those of radio frequency module 1A according to Working Example 1 will be omitted, and different points will be mainly described.

As illustrated in FIGS. 3A and 3B, in radio frequency module 1B according to the present variation, shielding film 94G is formed so as to cover the side surfaces of resin component 92 and module board 91. Shielding film 94G is, for example, a metal thin film formed by sputtering.

Here, as illustrated in FIG. 3A, inductor 41L is enclosed by wall body 81 and a portion of shielding film 94G in a plan view of module board 91. In other words, wall body 81 and the portion of shielding film 94G constitute the shielding wall.

According to the-above described configuration, inductor 41L is enclosed by the shielding wall that includes wall body 81, and thus it is possible to further improve the isolation between the transmission side and the reception side.

It should be noted that, it is desirable that a lower end of wall body 81 be connected to ground conductor 93G that module board 91 includes, and that an upper end of wall body 81 be connected to shielding film 94G, as illustrated in FIG. 3B. According to the above-described configuration, it is possible to strengthen the electromagnetic shielding function of the above-described shielding wall.

4. Arrangement Configuration of Circuit Elements of Radio Frequency Module 1C According to Variation 2

Figure 4:
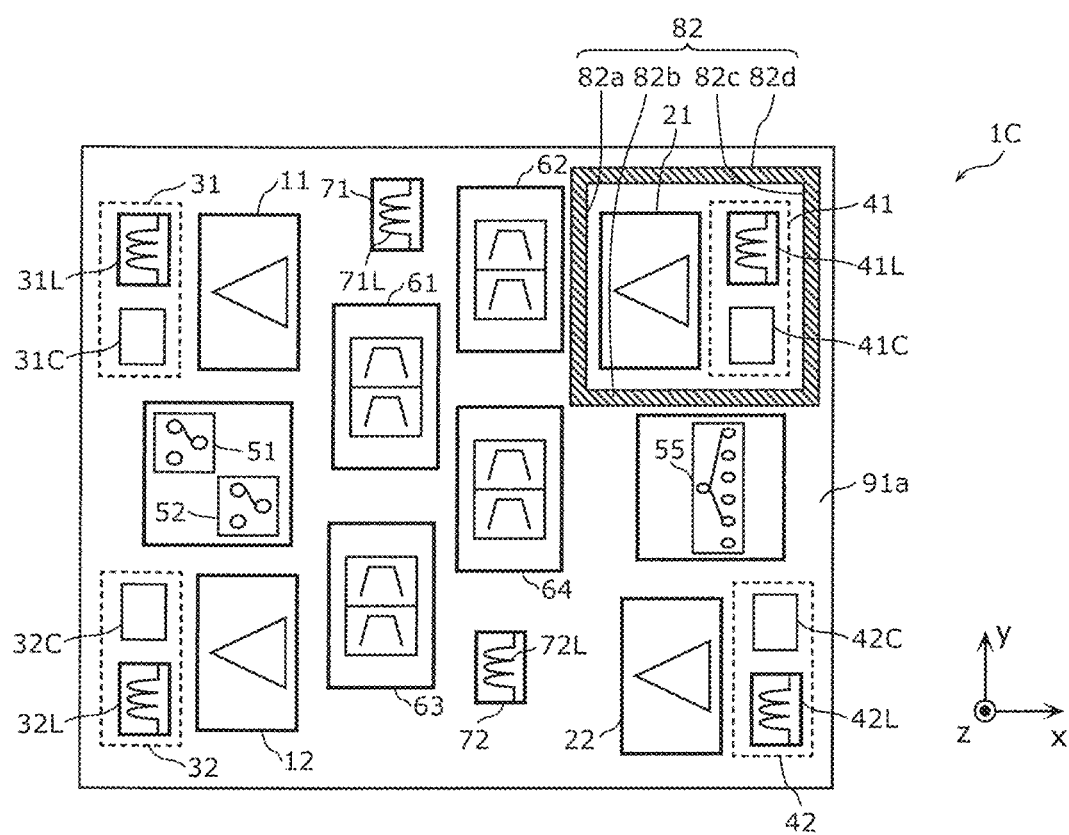
FIG. 4 is a schematic diagram illustrating a plan view configuration of a radio frequency module according to Variation 2.

FIG. 4 is a schematic diagram illustrating a plan view configuration of radio frequency module 1C according to Variation 2. Radio frequency module 1C according to Variation 2 specifically illustrates the arrangement configuration of the respective circuit elements included in radio frequency module 1 according to the embodiment.

Radio frequency module 1C according to the present variation is different in the configuration of wall body 82 from radio frequency module 1A according to Working Example 1. Hereinafter, radio frequency module 1C according to the present variation will be described. In the description, the same points as those of radio frequency module 1A according to Working Example 1 will be omitted, and different points will be mainly described.

Wall body 82, which is one example of the first wall body, is standed on module board 91 and made of plated metal. In other words, wall body 82 is a metal body that has been grown by plating. Wall body 82 protrudes in a z-axis positive direction from principal surface 91a of module board 91. Wall body 82 includes flat plate 82a and 82c formed along the y-axis direction and the z-axis direction and flat plate 82b and 82d formed along the x-axis direction and the z-axis direction.

In radio frequency module 1C according to the present variation, inductor 41L is enclosed by wall body 82 in a plan view of module board 91.

According to the-above described configuration, inductor 41L is enclosed by wall body 82, and thus it is possible to further improve the isolation between the transmission side and the reception side. In addition, flat plates 82b and 82d formed along the x-axis direction and flat plates 82a and 82c formed along the y-axis direction are disposed on module board 91, and thus it is possible to further reduce warpage of module board 91 that is caused by thermal stress.

It should be noted that reception low noise amplifier 21 may be disposed in addition to inductor 41L in the region enclosed by wall body 82 as illustrated in FIG. 4. In addition, in the region enclosed by wall body 82, a circuit element included in the reception circuit may be disposed in addition to inductor 42L and reception low noise amplifier 22. In addition, among the circuit elements included in the transmission circuit, a circuit element other than inductors 31L and 32L and transmission power amplifiers 11 and 12 may further be disposed in the region enclosed by wall body 82.

5. Arrangement Configuration of Circuit Elements of Radio Frequency Module 1D According to Working Example 2

Figure 5A:
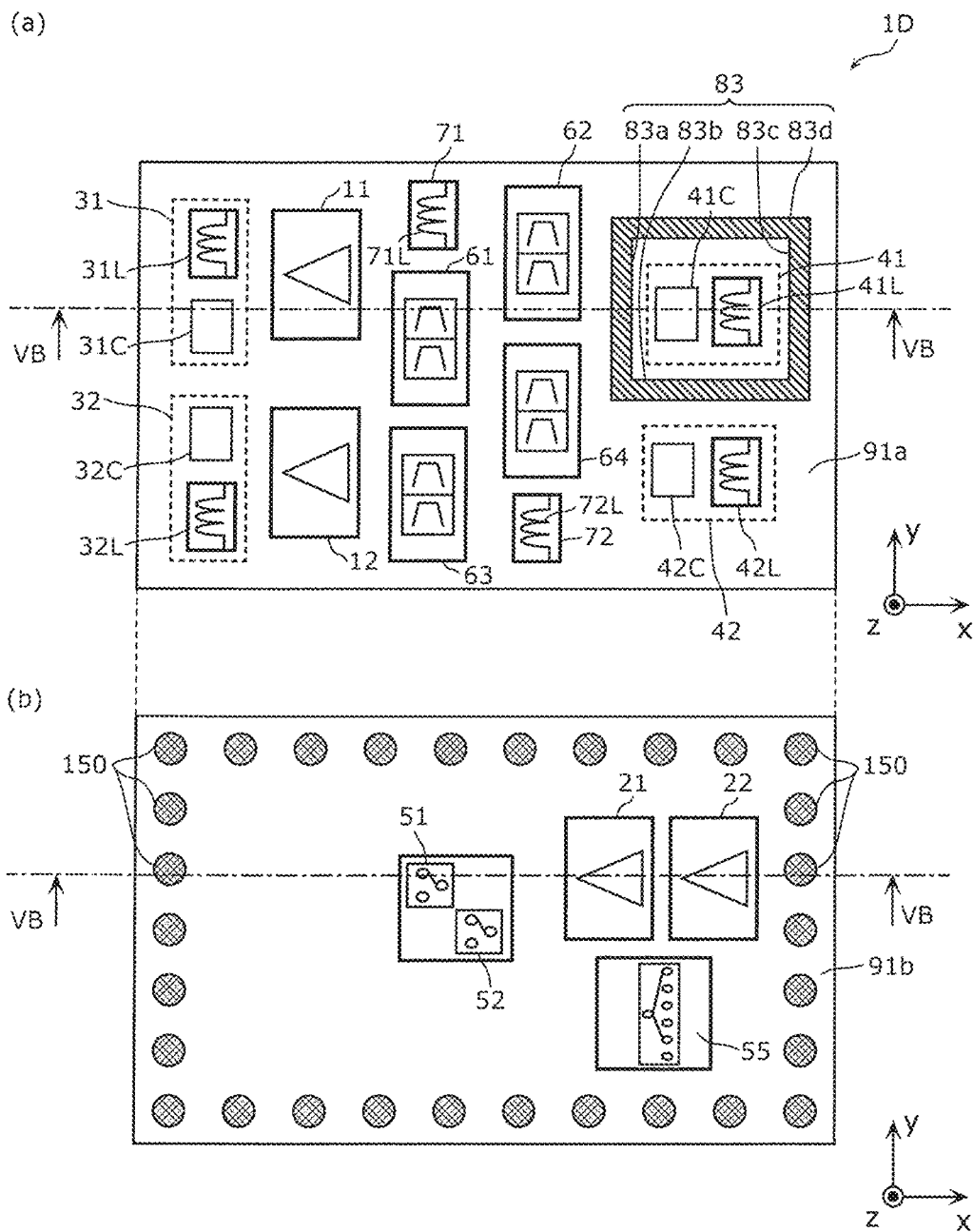
FIG. 5A is a schematic diagram illustrating a plan view configuration of a radio frequency module according to Working Example 2.
Figure 5B:
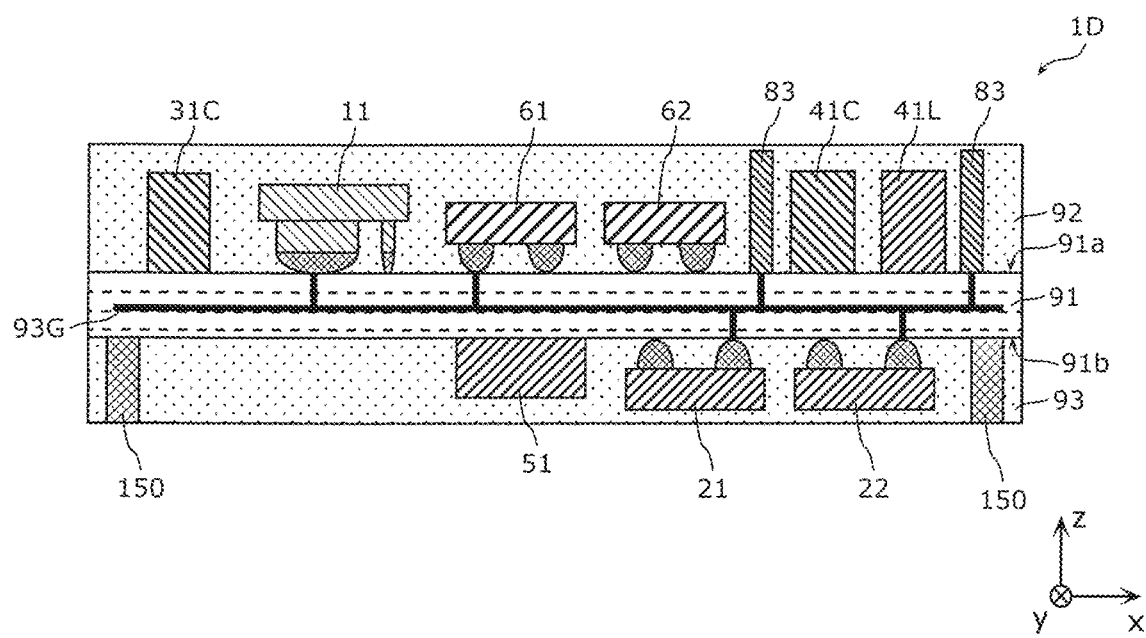
FIG. 5B is a schematic diagram illustrating a cross-sectional configuration of the radio frequency module according to Working Example 2.

FIG. 5A is a schematic diagram illustrating a plan view configuration of radio frequency module 1D according to Working Example 2. FIG. 5B is a schematic diagram illustrating a cross-sectional configuration of radio frequency module 1D according to Working Example 2. More specifically, FIG. 5B is a cross-sectional view taken along line VB-VB of FIG. 5A. It should be noted that (a) in FIG. 5A illustrates a layout of the circuit elements when, of principal surfaces 91a and 91b located on opposite sides of module board 91, principal surface 91a is viewed from the z-axis positive side. Meanwhile, (b) in FIG. 5A illustrates a perspective view of the layout of the circuit elements when principal surface 91b is viewed from the z-axis positive side.

Radio frequency module 1D according to Working Example 2 specifically illustrates the arrangement configuration of the respective circuit elements included in radio frequency module 1 according to the embodiment.

As illustrated in FIG. 5A and FIG. 5B, radio frequency module 1D according to the present working example further includes module board 91, wall body 83, resin components 92 and 93, and external-connection terminals 150, in addition to the circuit configuration illustrated in FIG. 1.

Radio frequency module 1D according to the present working example is different from radio frequency module 1A according to Example 1 in that circuit elements included in radio frequency module 1D are mounted on both of the principal surfaces of module board 91. Hereinafter, radio frequency module 1D according to the present working example will be described. In the description, the same points as those of radio frequency module 1A according to Working Example 1 will be omitted, and different points will be mainly described.

Module board 91 is a board which includes principal surface 91a (a first principal surface) and principal surface 91b (a second principal surface) on opposite sides thereof, and on which the above-described transmission circuit and the above-described reception circuit are mounted. As module board 91, for example, an LTCC board having a stacked structure including a plurality of dielectric layers, an HTCC board, a component built-in board, a board including an RDL, or a printed board or the like is used. It should be noted that antenna connection terminal 100, transmission input terminals 111 and 112, and reception output terminals 121 and 122 may be disposed on module board 91.

Wall body 83, which is one example of the first wall body, is standed on module board 91 and made of plated metal. In other words, wall body 83 is a metal body that has been grown by plating. Wall body 83 protrudes in a z-axis positive direction from principal surface 91a of module board 91. Wall body 83 includes flat plates 83a and 83c formed along the y-axis direction and the z-axis direction and flat plates 83b and 83d formed along the x-axis direction and the z-axis direction. It should be noted that wall body 83 need not necessarily include a plurality of flat plates as in the present working example. Wall body 83 may be a single flat plate. In addition, the flat plate included in wall body 83 may have a curved surface.

Resin component 92 is disposed on principal surface 91a of module board 91 and covers a portion of the above-described transmission circuit, a portion of the above-described reception circuit, and principal surface 91a of module board 91. Resin component 92 has a function of ensuring reliability such as mechanical strength and moisture resistance of the circuit elements included in the above-described transmission circuit and the above-described reception circuit. Resin component 93 is disposed on principal surface 91b of module board 91 and covers a portion of the above-described transmission circuit, a portion of the above-described reception circuit, and principal surface 91b of module board 91. Resin component 93 has a function of ensuring reliability such as mechanical strength and moisture resistance of the circuit elements included in the above-described transmission circuit and the above-described reception circuit. It should be noted that resin components 92 and 93 are not indispensable components for the radio frequency module according to the present disclosure.

A plurality of external-connection terminals 150 are disposed on principal surface 91b of module board 91. Radio frequency module 1D exchanges electrical signals with a motherboard disposed on the z-axis negative side of radio frequency module 1D via the plurality of external-connection terminals 150. In addition, one or some of the plurality of external-connection terminals 150 are set to the ground potential of the motherboard.

As illustrated in FIGS. 5A and 5B, in radio frequency module 1D according to the present working example, transmission power amplifiers 11 and 12, duplexers 61 to 64, matching circuits 31, 32, 41, 42, 71 and 72, and wall body 83 are mounted on principal surface 91a of module board 91. In addition, reception low noise amplifiers 21 and 22, and switches 51, 52, and 55 are mounted on principal surface 91b of module board 91. It should be noted that, although switches 53 and 54 and matching circuits 73 and 74 are not illustrated in FIG. 5A and FIG. 5B, switches 53 and 54 and matching circuits 73 and 74 may be mounted on any of principal surface 91a and 91b, or may be built-in in module board 91.

Here, in radio frequency module 1D according to the present working example, matching circuit 41 is enclosed by wall body 83. In other words, inductor 41L is enclosed by wall body 83. According to the above-described configuration, wall body 83 is disposed between inductor 41L and inductor 31L in a plan view of principal surface 91a. In addition, wall body 83 is disposed between inductor 41L and inductor 32L in a plan view of principal surface 91a.

According to this configuration, wall body 83 made of plated metal is disposed between inductor 41L and inductor 31L which are mounted on principal surface 91a of module board 91. For that reason, it is possible to shield electromagnetic fields generated from inductors 41L and 31L, by wall body 83 that has high conductivity. As a result, it is possible to significantly reduce electromagnetic field coupling between inductor 41L and inductor 31L. It is thus possible to improve the isolation between the transmission side and the reception side.

In addition, wall body 83 made of plated metal is disposed between inductor 41L and inductor 32L which are mounted on principal surface 91a of module board 91. Accordingly, it is possible to reduce the amount of harmonic components of a high-power radio frequency transmission signal that has been amplified by transmission power amplifier 12 of the second transmission circuit flowing into the first reception circuit, or the amount of intermodulation distortion components between the high-power radio frequency transmission signal and another radio frequency signal flowing into the first reception circuit. As a result, it is possible to reduce deterioration in the reception sensitivity of radio frequency module 1D.

In addition, according to the manufacturing process of radio frequency module 1D according to the present working example, it is possible to mount transmission power amplifiers 11 and 12, reception low noise amplifiers 21 and 22, switches 51 to 55, and duplexers 61 to 64 to be mounted on principal surface 91a or 91b of module board 91, after the forming process of wall body 83. For that reason, it is possible to avoid property degradation and structural disorder of these semiconductor components, which are caused due to heating during the forming process of wall body 83. In addition, the forming process of wall body 83 does not include heating to be performed for a long period of time, and thus it is possible to reduce warpage or waviness of module board 91.

It should be noted that, in radio frequency module 1D according to the present working example, transmission power amplifiers 11 and 12 are not disposed in the region enclosed by wall body 83. According to the above-described configuration, it is possible to reduce electromagnetic field coupling between (i) transmission power amplifiers 11 and (ii) the first reception circuit including inductor 41L. It is thus possible to further improve the isolation between the transmission side and the reception side.

In addition, inductor 42L may be disposed in the region enclosed by wall body 83. According to this configuration, wall body 83 made of plated metal is disposed between inductor 42L and inductor 32L which are mounted on principal surface 91a of module board 91. For that reason, it is possible to shield electromagnetic fields generated from inductors 42L and 32L, by wall body 83 that has high conductivity. As a result, it is possible to significantly reduce electromagnetic field coupling between inductor 42L and inductor 32L. It is thus possible to improve the isolation between the transmission side and the reception side.

In addition, wall body 83 made of plated metal is disposed between inductor 42L and inductor 31L which are mounted on principal surface 91a of module board 91. For that reason, it is possible to reduce the amount of harmonic components of a high-power radio frequency transmission signal that has been amplified by transmission power amplifier 11 of the first transmission circuit flowing into the second reception circuit, or the amount of intermodulation distortion components between the high-power radio frequency transmission signal and another radio frequency signal flowing into the second reception circuit. As a result, it is possible to reduce deterioration in the reception sensitivity of radio frequency module 1D.

In addition, in radio frequency module 1D according to the present working example, transmission power amplifiers 11 and 12 are mounted on principal surface 91a, and reception low noise amplifiers 21 and 22 are mounted on principal surface 91b.

According to the-above described configuration, since transmission power amplifiers 11 and 12 and reception low noise amplifiers 21 and 22 are separately disposed on principal surface 91a and 91b of module board 91, it is possible to improve the isolation between the transmission side and the reception side. Furthermore, it is possible to reduce the amount of harmonic components of a high-power radio frequency transmission signal that has been amplified by transmission power amplifiers 11 and 12 flowing into the reception circuit, or the amount of intermodulation distortion components between the high-power radio frequency transmission signal and another radio frequency signal flowing into the reception circuit. As a result, it is possible to further reduce deterioration in the reception sensitivity of radio frequency module 1D.

In addition, transmission power amplifiers 11 and 12 are components that generate a large amount of heat among the circuit components included in radio frequency module 1D. In order to improve the heat dissipation property of radio frequency module 1D, it is important to dissipate heat generated by transmission power amplifiers 11 and 12 to the motherboard through a heat dissipation path having a small thermal resistance. If transmission power amplifiers 11 and 12 are mounted on principal surface 91b, the electrode lines connected to transmission power amplifiers 11 and 12 are arranged on principal surface 91b. For that reason, as the heat dissipation path, a heat dissipation path that passes though only a planar line pattern (along the xy plane direction) on principal surface 91b is included. The above-described planar line pattern is formed using a metal thin film, and thus has a large thermal resistance. For that reason, when transmission power amplifiers 11 and 12 are disposed on principal surface 91b, the heat dissipation property is decreased. In contrast, when transmission power amplifiers 11 and 12 are mounted on principal surface 91a, it is possible to connect transmission power amplifiers 11 and 12 to external-connection terminals 150 via penetrating electrodes that penetrate through module board 91. As a result, it is possible to exclude a heat dissipation path that passes through only the planar line pattern along the xy plane direction which has a large thermal resistance, from among the lines in module board 91, as the heat dissipation paths for transmission power amplifiers 11 and 12. Accordingly, the heat dissipation property for dissipating heat from transmission power amplifiers 11 and 12 to the motherboard is improved.

In addition, in radio frequency module 1D according to the present working example, transmission power amplifiers 11 and 12 and inductors 31L, 32L, 41L, 42L, 71L, and 72L which are difficult to reduce the heights are not disposed on, of principal surfaces 91a and 91b, principal surface 91b that faces the motherboard, but reception low noise amplifiers 21 and 22 and switches 51, 52, and 55 which are easy to reduce the heights are disposed on principal surface 91b. According to this configuration, it is possible to reduce the height of radio frequency module 1D as a whole. In addition, a plurality of external-connection terminals 150 that are applied as ground electrodes are disposed in the vicinity of reception low noise amplifiers 21 and 22 that significantly affect the reception sensitivity of the reception circuit. As a result, it is possible to reduce deterioration in the reception sensitivity of the reception circuit.

It should be noted that external-connection terminals 150 may be columnar electrodes that penetrate through resin component 93 in the z-axis direction as illustrated in FIG. 5A and FIG. 5B, or bump electrodes formed on principal surface 91b.

Figure 5C:
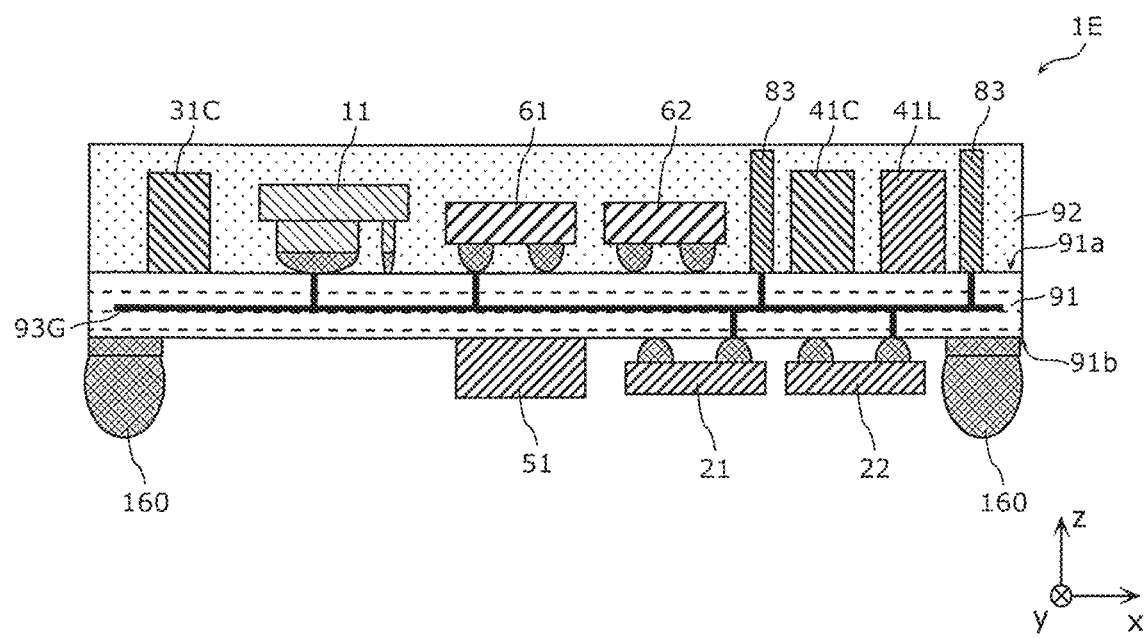
FIG. 5C is a schematic diagram illustrating a cross-sectional configuration of a radio frequency module according to Variation 3.

FIG. 5C is a schematic diagram illustrating a cross-sectional configuration of radio frequency module 1E according to Variation 3. As in radio frequency module 1E according to Variation 3 as illustrated in the diagram, external-connection terminals 150 may be bump electrodes 160 disposed on principal surface 91b. In this case, resin component 93 on principal surface 91b need not be included in radio frequency module 1E.

6. Arrangement Configuration of Circuit Elements of Radio Frequency Module 1F According to Variation 4

Figure 6A:
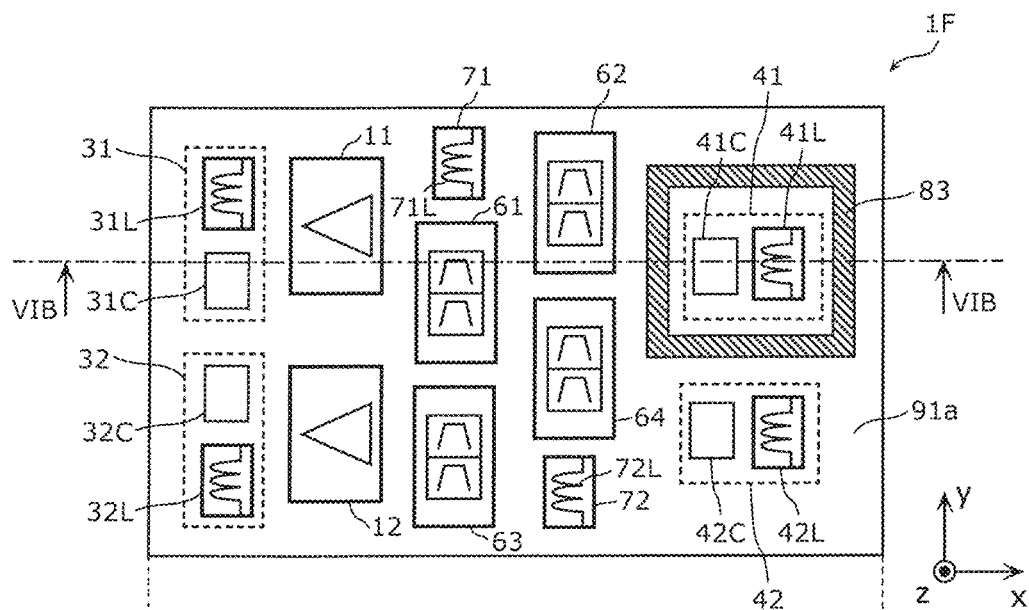
FIG. 6A is a schematic diagram illustrating a plan view configuration of a radio frequency module according to Variation 4.
Figure 6A:
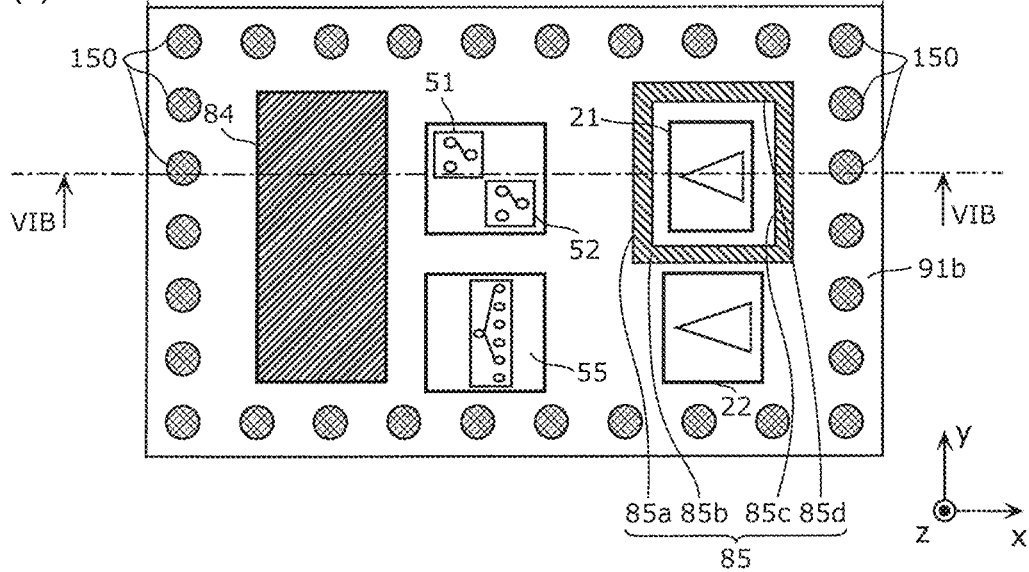
Figure 6B:
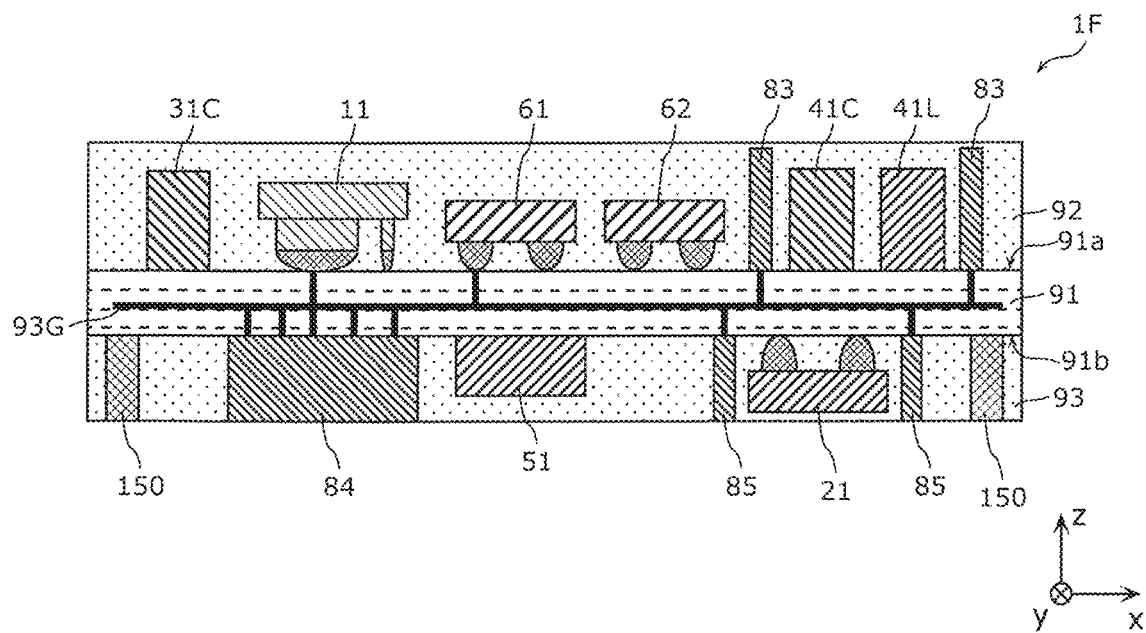
FIG. 6B is a schematic diagram illustrating a cross-sectional configuration of the radio frequency module according to Variation 4.

FIG. 6A is a schematic diagram illustrating a plan view configuration of radio frequency module 1F according to Variation 4. FIG. 6B is a schematic diagram illustrating a cross-sectional configuration of radio frequency module 1F according to Variation 4. More specifically, FIG. 6B is a cross-sectional view taken along line VIB-VIB of FIG. 6A. It should be noted that (a) in FIG. 6A illustrates a layout of the circuit elements when, of principal surfaces 91a and 91b located on opposite sides of module board 91, principal surface 91a is viewed from the z-axis positive side. Meanwhile, (b) in FIG. 6A illustrates a perspective view of the layout of the circuit elements when principal surface 91b is viewed from the z-axis positive side.

Radio frequency module 1F according to Variation 4 specifically illustrates the arrangement configuration of the respective circuit elements included in radio frequency module 1 according to the embodiment.

As illustrated in FIG. 6A and FIG. 6B, radio frequency module 1F according to the present variation further includes module board 91, wall bodies 83 and 85, resin components 92 and 93, a plurality of external-connection terminals 150, and heat dissipator 84 in addition to the circuit configuration illustrated in FIG. 1.

Radio frequency module 1F according to the present variation is different from radio frequency module 1D according to Example 2 in that wall body 85 and heat dissipator 84 are disposed on principal surface 91b. Hereinafter, radio frequency module 1F according to the present variation will be described. In the description, the same points as those of radio frequency module 1D according to Working Example 2 will be omitted, and different points will be mainly described.

Wall body 85, which is one example of the third wall body, is standed on principal surface 91b of module board 91 and made of plated metal. In other words, wall body 85 is a metal body that has been grown by plating. Wall body 85 protrudes in the z-axis negative direction from principal surface 91b. Wall body 85 includes flat plates 85a and 85c formed along the y-axis direction and the z-axis direction and flat plates 85b and 85d formed along the x-axis direction and the z-axis direction.

Here, reception low noise amplifier 21 is enclosed by wall body 85.

According to the above-described configuration, it is possible to significantly reduce the electromagnetic field coupling between inductor 41L and inductors 31L and 32L by wall body 83, and further possible to reduce electromagnetic field coupling between the transmission circuit and reception low noise amplifier 21 by wall body 85. It is thus possible to further improve the isolation between the transmission side and the reception side. In addition, it is possible to reduce the amount of harmonic components of a high-power radio frequency transmission signal that has been output from the transmission circuit flowing into the first reception circuit, or the amount of intermodulation distortion components between the high-power radio frequency transmission signal and another radio frequency signal flowing into the first reception circuit. As a result, it is possible to further reduce deterioration in the reception sensitivity of radio frequency module 1F.

It should be noted that reception low noise amplifier 22 may be disposed in the region enclosed by wall body 85. In addition, in the region enclosed by wall body 85, a circuit element included in the reception circuit may be disposed in addition to reception low noise amplifiers 21 and 22. In addition, among the circuit elements included in the transmission circuit, a circuit element other than inductors 31L and 32L and transmission power amplifiers 11 and 12 may further be disposed in the region enclosed by wall body 85.

In addition, in radio frequency module 1F according to the present variation, heat dissipator 84 is disposed in a region on principal surface 91b across a region in which transmission power amplifiers 11 and 12 are formed on principal surface 91a as illustrated in FIG. 6A. Heat dissipator 84 is made of plated metal. In addition, as illustrated in FIG. 6B, heat dissipator 84 is connected to transmission power amplifiers 11 and 21 disposed on principal surface 91a via ground conductor 93G and a via conductor that module board 91 includes, and exposed from resin component 93.

According to the above-described configuration, it is possible to dissipate heat generated in transmission power amplifiers 11 and 12 to the principal surface 91b side via heat dissipator 84 that has high conductivity. As a result, the heat dissipation property of radio frequency module 1F is further improved.

It should be noted that heat dissipator 84 may be formed by the same plating forming process as wall bodies 83 and 85. This allows the manufacturing process to be simplified.

In addition, in radio frequency module 1F according to the present variation, external-connection terminals 150 may be made of plated metal.

According to this, since external-connection terminals 150 can be made of plated metal that has high conductivity, it is possible to reduce transfer loss of radio frequency signals passing through external-connection terminals 150. In addition, when external-connection terminals 150 are ground terminals, electromagnetic shielding property is improved. In addition, since external-connection terminals 150 can be formed in the same plating forming process as wall bodies 83 and 85 and heat dissipator 84, it is possible to simplify the manufacturing process.

7. Arrangement Configuration of Circuit Elements of Radio Frequency Module 1G According to Variation 5

Figure 7A:
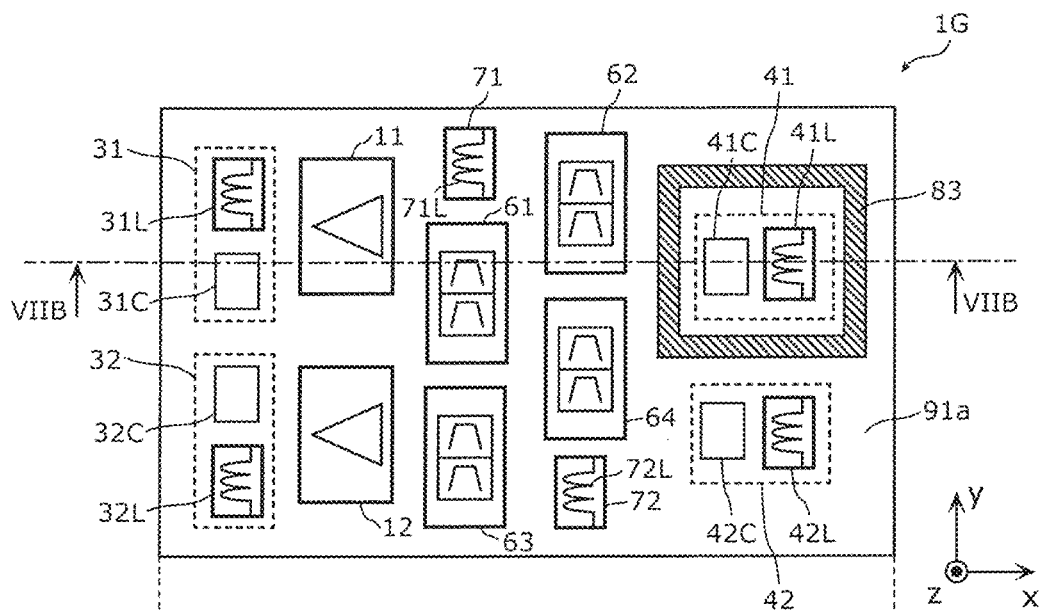
FIG. 7A is a schematic diagram illustrating a plan view configuration of a radio frequency module according to Variation 5.
Figure 7A:
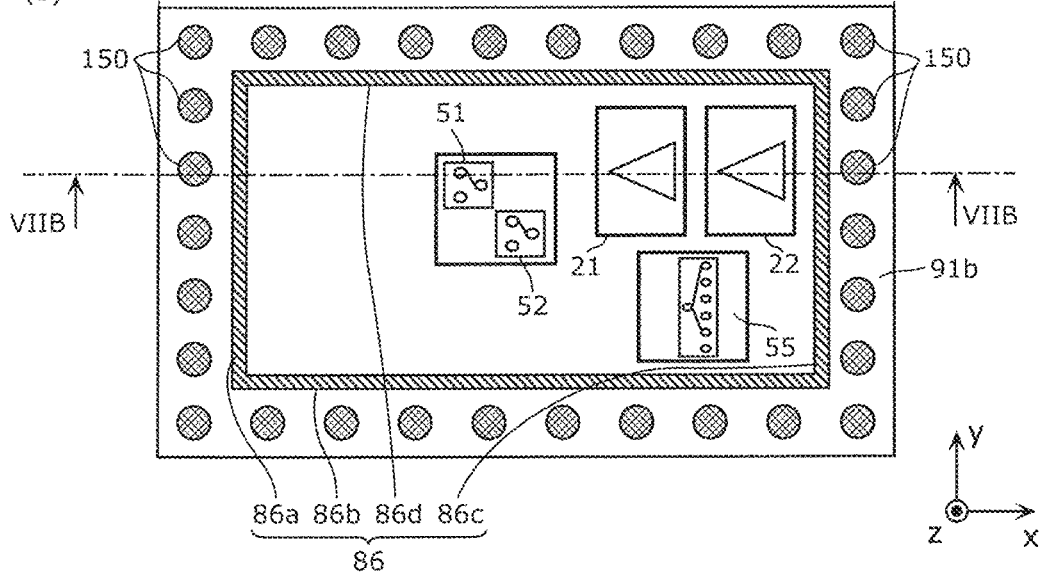
Figure 7B:
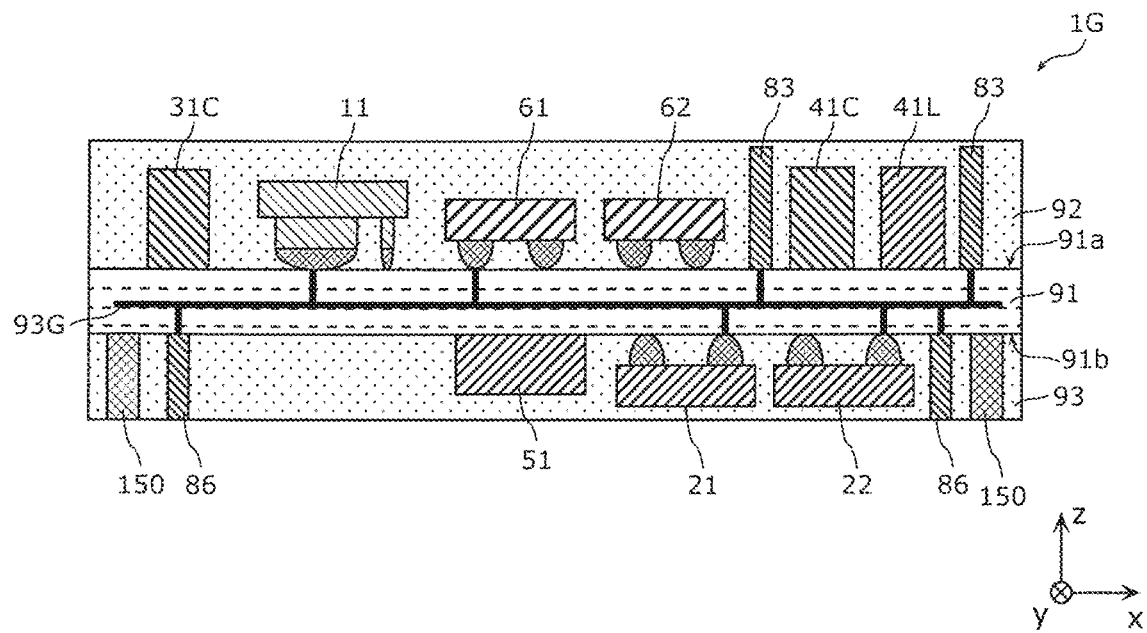
FIG. 7B is a schematic diagram illustrating a cross-sectional configuration of the radio frequency module according to Variation 5.

FIG. 7A is a schematic diagram illustrating a plan view configuration of radio frequency module 1G according to Variation 5. FIG. 7B is a schematic diagram illustrating a cross-sectional configuration of radio frequency module 1G according to Variation 5. More specifically, FIG. 7B is a cross-sectional view taken along line VIIB-VIIB of FIG. 7A. It should be noted that (a) in FIG. 7A illustrates a layout of the circuit elements when, of principal surfaces 91a and 91b located on opposite sides of module board 91, principal surface 91a is viewed from the z-axis positive side. Meanwhile, (b) in FIG. 7A illustrates a perspective view of the layout of the circuit elements when principal surface 91b is viewed from the z-axis positive side.

Radio frequency module 1G according to Variation 5 specifically illustrates the arrangement configuration of the respective circuit elements included in radio frequency module 1 according to the embodiment.

As illustrated in FIG. 7A and FIG. 7B, radio frequency module 1G according to the present variation further includes module board 91, wall bodies 83 and 86, resin components 92 and 93, and a plurality of external-connection terminals 150, in addition to the circuit configuration illustrated in FIG. 1.

Radio frequency module 1G according to the present variation is different from radio frequency module 1D according to Example 2 in that wall body 86 is disposed on principal surface 91b. Hereinafter, radio frequency module 1G according to the present variation will be described. In the description, the same points as those of radio frequency module 1D according to Working Example 2 will be omitted, and different points will be mainly described.

Wall body 86 is standed on principal surface 91b of module board 91 and made of plated metal. In other words, wall body 86 is a metal body that has been grown by plating. Wall body 86 protrudes in the z-axis negative direction from principal surface 91b. Wall body 86 includes flat plates 86a and 86c formed along the y-axis direction and the z-axis direction and flat plates 86b and 86d formed along the x-axis direction and the z-axis direction. It should be noted that wall body 86 need not necessarily include a plurality of flat plates as in the present working example. Wall body 86 may be a single flat plate. In addition, the flat plate included in wall body 86 may have a curved surface.

Wall body 86 is disposed between (i) the plurality of external-connection terminals 150 arranged in a periphery region of principal surface 91b and (ii) reception low noise amplifiers 21 and 22 and switches 51, 52, and 55, in a plan view of principal surface 91b. In other words, wall body 86 is disposed so as to separate (i) the plurality of external-connection terminals 150 and (ii) reception low noise amplifiers 21 and 22 and switches 51, 52, and 55. It should be noted that it is desirable that wall body 86 be connected to ground conductor 93G that module board 91 includes.

According to the-above described configuration, since the circuit elements disposed on principal surface 91b are enclosed by wall body 86, it is possible to strengthen the shielding against a spurious signal or the like coming from outside radio frequency module 1G. In addition, when the plurality of external-connection terminals 150 are terminals that transfer a radio frequency signal, it is possible to reduce the electromagnetic field coupling between the plurality of external-connection terminals 150 and the circuit elements disposed on principal surface 91b. In addition, when the plurality of external-connection terminals 150 are terminals that transfer a digital signal output from the control circuit, it is possible to inhibit digital noise from flowing into the circuit elements disposed on principal surface 91b.

8. Advantageous Effects, Etc

As described above, radio frequency module 1 according to the present embodiment includes: module board 91; transmission power amplifier 11; inductor 31L mounted on module board 91 and connected to an output terminal of transmission power amplifier 11; reception low noise amplifier 21; inductor 41L mounted on module board 91 and connected to an input terminal of reception low noise amplifier 21; and wall body 81 disposed on module board 91 and made of plated metal. Wall body 81 is disposed between inductor 41L and inductor 31L in a plan view of module board 91.

According to the-above described configuration, wall body 81 that separates inductor 41L and inductor 31L has a high density and high conductivity. For that reason, it is possible to shield the electromagnetic fields generated from inductors 41L and 31L, by wall body 81. As a result, it is possible to significantly reduce electromagnetic field coupling between inductor 41L and inductor 31L. It is thus possible to improve the isolation between the transmission side and the reception side. Furthermore, it is possible to reduce the amount of harmonic components of a high-power radio frequency transmission signal that has been amplified by transmission power amplifier 11 flowing into the reception circuit, or the amount of intermodulation distortion components between the high-power radio frequency transmission signal and another radio frequency signal flowing into the reception circuit. As a result, it is possible to reduce deterioration in the reception sensitivity of radio frequency module 1.

In addition, inductor 41L may be enclosed by a shielding wall in a plan view of module board 91, and at least a portion of the shielding wall may be wall body 81.

According to the-above described configuration, inductor 41L is enclosed by the shielding wall that includes wall body 81, and thus it is possible to further improve the isolation between the transmission side and the reception side.

In addition, inductor 41L may be enclosed by wall body 81 in a plan view of module board 91.

According to the-above described configuration, inductor 41L is enclosed by wall body 81, and thus it is possible to further improve the isolation between the transmission side and the reception side. In addition, wall body 81 that is made of plated metal having a high density is disposed on module board 91, and thus it is possible to reduce warpage of module board 91 which is caused by thermal stress.

In addition, wall body 81 may be connected to ground conductor 93G that module board 91 includes.

According to the above-described configuration, it is possible to strengthen the electromagnetic shielding function of wall body 81.

In addition, radio frequency module 1 according to the present embodiment may further include antenna connection terminal 100; transmission filter 61T connected to inductor 31L; reception filter 61R connected to inductor 41L; inductor 71L disposed between (i) antenna connection terminal 100 and (ii) transmission filter 61T and reception filter 61R; and wall body 81 made of plated metal and disposed between inductor 41L and inductor 71L in a plan view of module board 91.

According to the above-described configuration, wall body 81 is disposed between inductor 41L and inductor 71L which are mounted on module board 91, and thus it is possible to significantly reduce the electromagnetic field coupling between inductor 41L and inductor 71L. In particular, it is possible to inhibit (i) a radio frequency signal that has been input from antenna connection terminal 100 and (ii) a high-power radio frequency transmission signal that has been amplified by transmission power amplifier 11 and a harmonic component thereof from flowing into a reception circuit without passing through reception filter 61R. As a result, it is possible to reduce deterioration in the reception sensitivity of radio frequency module 1.

In addition, transmission power amplifier 11 may be mounted on module board 91 and disposed in, of two regions on module board 91 that are separated by wall body 81, a region in which inductor 31L is disposed, reception low noise amplifier 21 may be mounted on module board 91 and disposed in, of the two regions, a region in which inductor 41L is disposed, and transmission power amplifier 11 and reception low noise amplifier 21 may be separated by wall body 81.

According to the above-described configuration, it is possible to shield the electromagnetic field generated from transmission power amplifier 11 and reception low noise amplifier 21, by wall body 81 that has a high conductivity. As a result, it is possible to significantly reduce the electromagnetic field coupling between (i) the transmission circuit including transmission power amplifier 11 and inductor 31L and (ii) the reception circuit including reception low noise amplifier 21 and inductor 41L. It is thus possible to improve the isolation between the transmission side and the reception side.

In addition, module board 91 may include principal surface 91a and principal surface 91b on opposite sides of module board 91, radio frequency module 1 may further include external-connection terminal 150 disposed on principal surface 91b, transmission power amplifier 11 may be mounted on principal surface 91a, reception low noise amplifier 21 may be mounted on principal surface 91b, inductor 31L and inductor 41L may be mounted on principal surface 91a, and inductor 31L and inductor 41L may be separated by wall body 81 disposed on principal surface 91a.

According to the above-described configuration, wall body 81 that is made of plated metal is disposed between inductor 31L and inductor 41L which are mounted on principal surface 91a, and thus it is possible to significantly reduce the electromagnetic field coupling between inductor 31L and inductor 41L. In addition, since transmission power amplifier 11 and reception low noise amplifier 21 are separately disposed principal surface 91a and 91b of module board 91, it is possible to improve the isolation between the transmission side and the reception side. Furthermore, it is possible to reduce the amount of harmonic components of a high-power radio frequency transmission signal that has been amplified by transmission power amplifier 11 flowing into the reception circuit, or the amount of intermodulation distortion components between the high-power radio frequency transmission signal and another radio frequency signal flowing into the reception circuit. As a result, it is possible to reduce deterioration in the reception sensitivity of radio frequency module 1.

In addition, since transmission power amplifier 11 is mounted on principal surface 91a, it is possible to connect transmission power amplifier 11 to external-connection terminals 150 via penetrating electrodes that penetrate through module board 91. As a result, it is possible to exclude a heat dissipation path that passes through only the planar line pattern along the xy plane direction which has a large thermal resistance, from among the lines in module board 91, as the heat dissipation paths for transmission power amplifier 11. Accordingly, heat dissipation property for dissipating heat from transmission power amplifier 11 to the motherboard is improved.

In addition, reception low noise amplifier 21 may be enclosed by wall body 85 made of plated metal and disposed on principal surface 91b.

According to the above-described configuration, it is possible to significantly reduce the electromagnetic field coupling between inductor 31L and inductor 41L by wall body 85, and further to reduce the electromagnetic field coupling between the transmission circuit and reception low noise amplifier 21. It is thus possible to further improve the isolation between the transmission side and the reception side.

In addition, radio frequency module 1 according to the present embodiment may further include heat dissipator 84 made of plated metal and disposed in a region of principal surface 91b that is across a region in which transmission power amplifier 11 is formed on principal surface 91a.

According to the above-described configuration, it is possible to dissipate heat generated in transmission power amplifier 11 to the principal surface 91b side via heat dissipator 84. As a result, the heat dissipation property of radio frequency module 1 is further improved.

In addition, external-connection terminal 150 may be made of plated metal.

According to this, since external-connection terminals 150 can be made of plated metal that has a high density and high conductivity, it is possible to reduce transfer loss of radio frequency signals passing through external-connection terminals 150. In addition, when external-connection terminals 150 are ground terminals, electromagnetic shielding property is improved. In addition, since external-connection terminals 150 can be formed in the same plating forming process as wall body 85 and heat dissipator 84 which are disposed on principal surface 91b, it is possible to simplify the manufacturing process.

In addition, transmission power amplifier 12 may be an amplifier configured to amplify a radio frequency signal of a frequency band included in a low band group having a frequency range less than or equal to 1 GHz, and reception low noise amplifier 21 may be an amplifier configured to amplify a radio frequency signal of a frequency band included in one of a middle band group and a high band group, the middle band group having a frequency range from 1.5 GHz to 2.2 GHz, the high band group having a frequency range from 2.4 GHz to 2.8 GHz.

According to the-above described configuration, the frequency of a harmonic of a radio frequency transmission signal that has been amplified by transmission power amplifier 12 corresponding to the low band group is included in the middle band group or the high band group. In this case as well, the electromagnetic field coupling between inductor 32L and inductor 41L can be significantly reduced by wall body 81, and thus it is possible to reduce the amount of the harmonic flowing into the reception circuit. As a result, it is possible to reduce deterioration in the reception sensitivity of radio frequency module 1.

In addition, communication device 5 includes RFIC 3 configured to process a radio frequency signal to be transmitted by antenna 2 and a radio frequency signal received by antenna 2; and radio frequency module 1 configured to transfer the radio frequency signals between antenna 2 and RFIC 3.

According to the-above described configuration, the isolation between the transmission side and the reception side can be improved, and it is possible to provide communication device 5 that reduces deterioration in the reception sensitivity.

Other Embodiments, Etc

Although the radio frequency module and the communication device according to the embodiment of the present disclosure have been described above based on the working examples and variations, the radio frequency module and the communication device according to the present disclosure are not limited to the foregoing embodiment, working examples, and variations. The present disclosure also encompasses: other embodiments achieved by combining arbitrary structural components in the above-described embodiment, working examples, and variations; variations resulting from various modifications to the above-described embodiment, working examples, and variations that may be conceived by those skilled in the art without departing from the essence of the present disclosure; and various devices that include the above-described radio frequency module and the communication device.

For example, in the radio frequency module and the communication device according to the foregoing embodiment, working examples, and the variations, another circuit element and line, for example, may be inserted in a path connecting circuit elements and a signal path which are disclosed in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable widely in communication apparatuses such as mobile phones as a radio frequency module disposed in a multiband-compatible front-end unit.

The invention claimed is:

1. A radio frequency module, comprising:
a module board;
a transmission power amplifier configured to amplify a radio frequency transmission signal;
a first inductance element mounted on the module board and connected to an output terminal of the transmission power amplifier;
a reception low noise amplifier configured to amplify a radio frequency reception signal;
a second inductance element mounted on the module board and connected to an input terminal of the reception low noise amplifier; and
a first wall body disposed on the module board and made of plated metal, wherein
the first wall body is disposed between the first inductance element and the second inductance element in a plan view of the module board.

2. The radio frequency module of claim 1, wherein
the second inductance element is enclosed by a shielding wall in a plan view of the module board.

3. The radio frequency module of claim 2, wherein
at least a portion of the shielding wall is the first wall body.

4. The radio frequency module of claim 1, wherein
the second inductance element is enclosed by the first wall body in a plan view of the module board.

5. The radio frequency module of claim 1, wherein
the first wall body is connected to a ground conductor that the module board includes.

6. The radio frequency module of claim 1, further comprising:
an antenna connection terminal;
a transmission filter connected to the first inductance element;
a reception filter connected to the second inductance element;
a third inductance element disposed between (i) the antenna connection terminal and (ii) the transmission filter and the reception filter; and
a second wall body made of plated metal and disposed between the second inductance element and the third inductance element in a plan view of the module board.

7. The radio frequency module of claim 1, wherein
the transmission power amplifier is disposed in, of two regions on the module board that are separated by the first wall body, a region in which the first inductance element is disposed.

8. The radio frequency module of claim 7, wherein
the reception low noise amplifier is disposed in, of the two regions, a region in which the second inductance element is disposed.

9. The radio frequency module of claim 8, wherein
the transmission power amplifier and the reception low noise amplifier are separated by the first wall body.

10. The radio frequency module of claim 1, wherein
the module board includes a first principal surface and a second principal surface on opposite sides of the module board, and
the radio frequency module further comprises an external-connection terminal disposed on the second principal surface.

11. The radio frequency module of claim 10, wherein
the transmission power amplifier is mounted on the first principal surface.

12. The radio frequency module of claim 11, wherein
the reception low noise amplifier is mounted on the second principal surface.

13. The radio frequency module of claim 12, wherein
the first inductance element and the second inductance element are mounted on the first principal surface.

14. The radio frequency module of claim 13, wherein the first wall body is disposed on the first principal surface.

15. The radio frequency module according to claim 14, wherein
the reception low noise amplifier is enclosed by a third wall body made of plated metal and disposed on the second principal surface.

16. The radio frequency module according to claim 14, further comprising:
a heat dissipator made of plated metal and disposed in a region of the second principal surface that is across a region in which the transmission power amplifier is formed on the first principal surface.

17. The radio frequency module according to claim 10, wherein
the external-connection terminal is made of plated metal.

18. The radio frequency module according to claim 1, wherein
the transmission power amplifier is configured to amplify a radio frequency signal of a frequency band included in a low band group having a frequency range less than or equal to 1 GHz, and
the reception low noise amplifier is configured to amplify a radio frequency signal of a frequency band included in one of a middle band group and a high band group, the middle band group having a frequency range from 1.5 GHz to 2.2 GHz, the high band group having a frequency range from 2.4 GHz to 2.8 GHz.

19. A communication device, comprising:
a radio frequency (RF) signal processing circuit configured to process a radio frequency signal to be transmitted by an antenna and a radio frequency signal received by the antenna; and
a radio frequency module configured to transfer the radio frequency signals between the antenna and the RF signal processing circuit, the radio frequency module comprising
a module board;
a transmission power amplifier configured to amplify a radio frequency transmission signal;
a first inductance element mounted on the module board and connected to an output terminal of the transmission power amplifier;
a reception low noise amplifier configured to amplify a radio frequency reception signal;
a second inductance element mounted on the module board and connected to an input terminal of the reception low noise amplifier; and
a first wall body disposed on the module board and made of plated metal, wherein
the first wall body is disposed between the first inductance element and the second inductance element in a plan view of the module board.

20. An electronic device, comprising:
a module board;
a first inductance element mounted on the module board and connected to an output terminal of a transmission power amplifier;
a second inductance element mounted on the module board and connected to an input terminal of a reception low noise amplifier; and
a first wall body disposed on the module board and made of plated metal, wherein
the first wall body is disposed between the first inductance element and the second inductance element in a plan view of the module board.

* * * * *